US012409657B2

(12) United States Patent
Hanagami et al.

(10) Patent No.: US 12,409,657 B2
(45) Date of Patent: Sep. 9, 2025

(54) LIQUID EJECTING APPARATUS

(71) Applicant: SEIKO EPSON CORPORATION, Tokyo (JP)

(72) Inventors: Taiki Hanagami, Matsumoto (JP); Junichiro Matsushita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 18/341,690

(22) Filed: Jun. 26, 2023

(65) Prior Publication Data

US 2024/0001674 A1 Jan. 4, 2024

(30) Foreign Application Priority Data

Jun. 29, 2022 (JP) ................................ 2022-105160

(51) Int. Cl.
*B41J 2/165* (2006.01)

(52) U.S. Cl.
CPC ........... *B41J 2/165* (2013.01); *B41J 2/16544* (2013.01)

(58) Field of Classification Search
CPC ......................... B41J 2/16544; B41J 2/16538; B41J 2/16585; B41J 2/16511
See application file for complete search history.

(56) References Cited

U.S. PATENT DOCUMENTS

| | | | | |
|---|---|---|---|---|
| 8,602,521 B2 * | 12/2013 | Sato | B41J 23/025 | 347/30 |
| 8,967,765 B2 * | 3/2015 | Miyazawa | B41J 2/16547 | 347/29 |
| 2009/0289992 A1 * | 11/2009 | Kawabata | B41J 2/16538 | 347/33 |

FOREIGN PATENT DOCUMENTS

| | | |
|---|---|---|
| JP | 2004-009512 A | 1/2004 |

* cited by examiner

*Primary Examiner* — Sharon Polk
(74) *Attorney, Agent, or Firm* — WORKMAN NYDEGGER

(57) ABSTRACT

A configuration includes a liquid ejecting head that ejects a liquid in an ejecting direction along a first axis, a medium supporting member that has a supporting surface supporting a medium and an opening portion facing a nozzle, a cap that is disposed in the opening portion when viewed in the ejecting direction, a coupling member that couples the medium supporting member to the cap and has a base member and a first coupling member coupling the base member to the medium supporting member and configured to extend/contract in a direction along the first axis, and a moving mechanism that causes relative movement of the coupling member with respect to the liquid ejecting head along the first axis.

18 Claims, 16 Drawing Sheets

LIQUID EJECTING APPARATUS

The present application is based on, and claims priority from JP Application Serial Number 2022-105160, filed Jun. 29, 2022, the disclosure of which is hereby incorporated by reference herein in its entirety.

BACKGROUND

1. Technical Field

The present disclosure relates to a liquid ejecting apparatus and, in particular, relates to an ink jet recording apparatus that ejects ink as a liquid.

2. Related Art

As a typical example of a liquid ejecting apparatus that ejects a liquid on a medium, an ink jet recording apparatus (hereinafter, may also be simply referred to as a "recording apparatus") is known. The ink jet recording apparatus includes an ink jet recording head (hereinafter, may also be simply referred to as a "recording head") that ejects ink as a liquid and performs printing by ejecting ink on a medium such as paper, a recording sheet, or the like from the recording head.

There are ink jet recording apparatuses having various structures. For example, there is an ink jet recording apparatus having a structure including a recording head that is supported by a support body fixed to the recording apparatus, a cap that covers an ejecting surface in which a nozzle of the recording head opens, and a medium supporting member that is provided to face the ejecting surface and supports a medium (for example, see JP-A-2004-9512).

Specifically, JP-A-2004-9512 discloses a configuration including a plurality of line heads having a discharge opening corresponding to a nozzle, a plurality of ink reservoirs provided to face respective line heads and having a cap member, a platen corresponding to the medium supporting member, a coupling member to which the ink reservoirs and the platen are fixed, a drive unit, and an up-and-down movement unit that moves the ink reservoirs and the platen up and down.

With such a configuration, only by the driving of the up-and-down movement unit, a capping movement that brings each ink reservoir into contact with the bottom surface of the line head can be performed. In addition, during recording operation, idle ejection (idle discharge) can be performed without disturbing the recording operation even without moving the ink reservoir. In addition, since there is no need to move the line head and the ink reservoir in a direction intersecting the ejecting direction for the capping operation and the idle ejection, a moving mechanism for moving the line head and the ink reservoir can be simplified and reduced in size. As a result, the recording apparatus can be simplified and reduced in size.

However, in the above configuration, since the medium supporting member and the cap integrally move up and down, there is a restriction in which, when the capping operation is performed, positions of the medium supporting member, the recording head, and the like have to be considered so that the medium supporting member does not collide with the recording head disposed above the medium supporting member, a head supporting member supporting the recording heads and the like. For example, in recent years, requirements for high image quality have increased, and in order to meet such requirements, a plurality of recording heads has been densely arranged. With such a configuration, it is difficult to dispose the medium supporting member in a gap between adjacent recording heads. As a result, the recording apparatus may not be sufficiently simplified or reduced in size.

Note that the issue described above similarly occurs not only in an ink jet recording apparatus including an ink jet recording head that ejects ink, but also in a liquid ejecting apparatus that ejects a liquid other than ink.

SUMMARY

According to an aspect of the present disclosure, a liquid ejecting apparatus includes a liquid ejecting head that has an ejecting surface including a nozzle that ejects a liquid in an ejecting direction along a first axis toward a medium, a medium supporting member that has a supporting surface supporting the medium and an opening portion facing the nozzle, a cap that is disposed in the opening portion when viewed in the ejecting direction, a coupling member that has a base member and a first coupling member coupling the base member to the medium supporting member and configured to extend/contract in a direction along the first axis and couples the medium supporting member to the cap, and a moving mechanism that causes relative movement of the coupling member with respect to the liquid ejecting head along the first axis.

According to another aspect of the present disclosure, a liquid ejecting apparatus includes a liquid ejecting head that has an ejecting surface including a nozzle that ejects a liquid in an ejecting direction along a first axis toward a medium, a plurality of medium supporting members that is arranged with a gap in between when viewed in the ejecting direction and has a supporting surface supporting the medium, a cap that is disposed in the gap when viewed in the ejecting direction, a coupling member that has a base member and a first coupling member coupling the base member to corresponding one of the medium supporting members and configured to extend/contract in a direction along the first axis and couples the medium supporting member to the cap, and a moving mechanism that causes relative movement of the coupling member with respect to the liquid ejecting head along the first axis.

DESCRIPTION OF EXEMPLARY EMBODIMENTS

Hereinafter, the present disclosure will be described in detail based on embodiments. However, the following description is a description of an aspect of the present disclosure, and the configuration of the present disclosure can be appropriately changed within the scope of the disclosure.

In addition, in each figure, X, Y, and Z represent an X-axis, a Y-axis, and a Z-axis, respectively, which are three spatial axes orthogonal to each other. In this specification, a direction along the X-axis is an X-axis direction, a direction along the Y-axis is a Y-axis direction, and a direction along the Z-axis is a Z-axis direction. In the description, for each of the X-axis direction, the Y-axis direction, and the Z-axis direction, a direction of the arrow in each figure is a positive (+) direction, and an opposite direction of the arrow is a negative (−) direction. In addition, the +Z direction indicates a vertically downward direction, and the −Z direction indicates a vertically upward direction. Moreover, each of the X-axis direction, the Y-axis direction, and the Z-axis direction is described as a direction that does not specify the positive direction and the negative direction.

Embodiment 1

Figure 1:
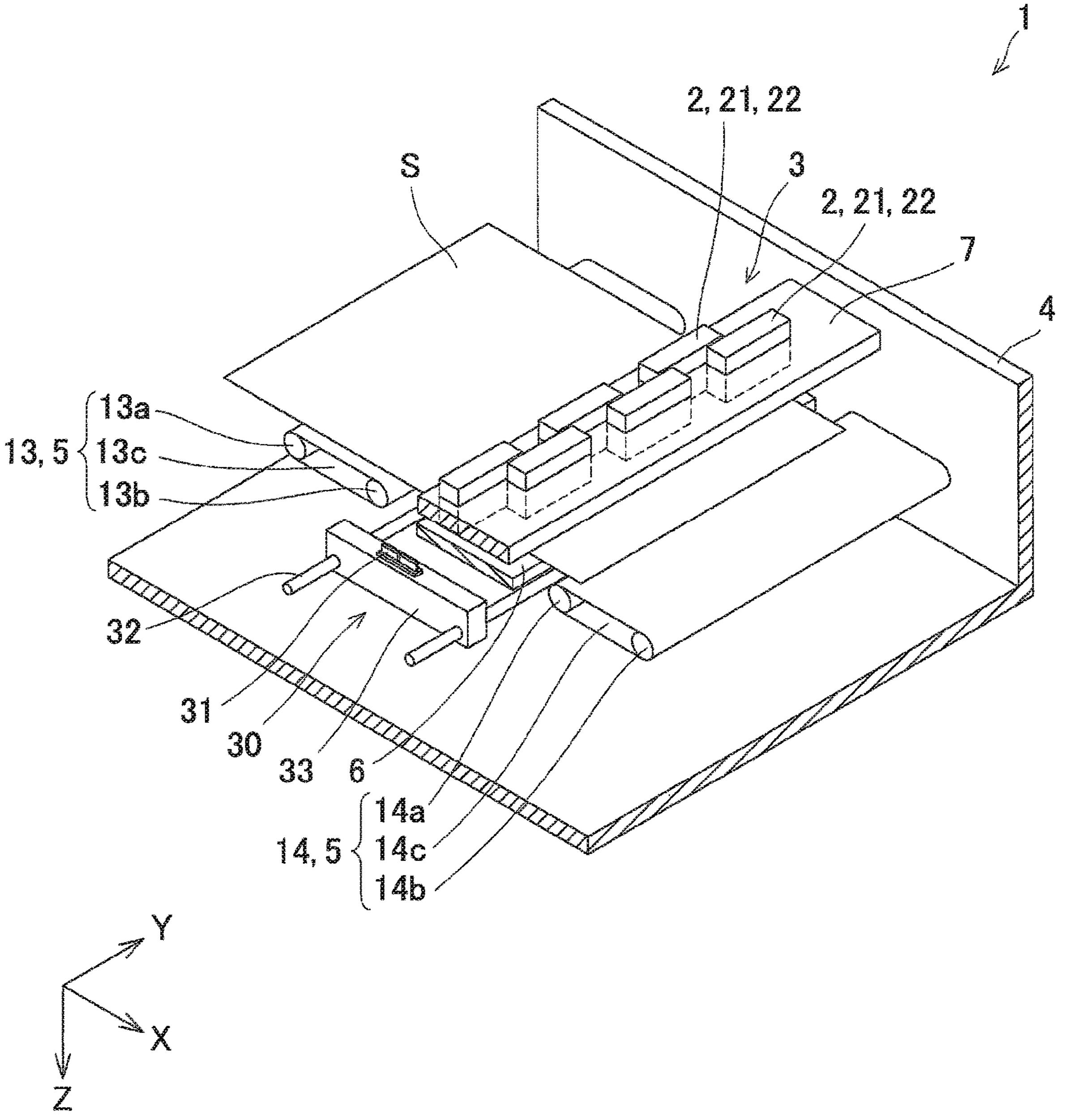
FIG. 1 is a schematic perspective view of a recording apparatus according to Embodiment 1 of the present disclosure.
Figure 2:
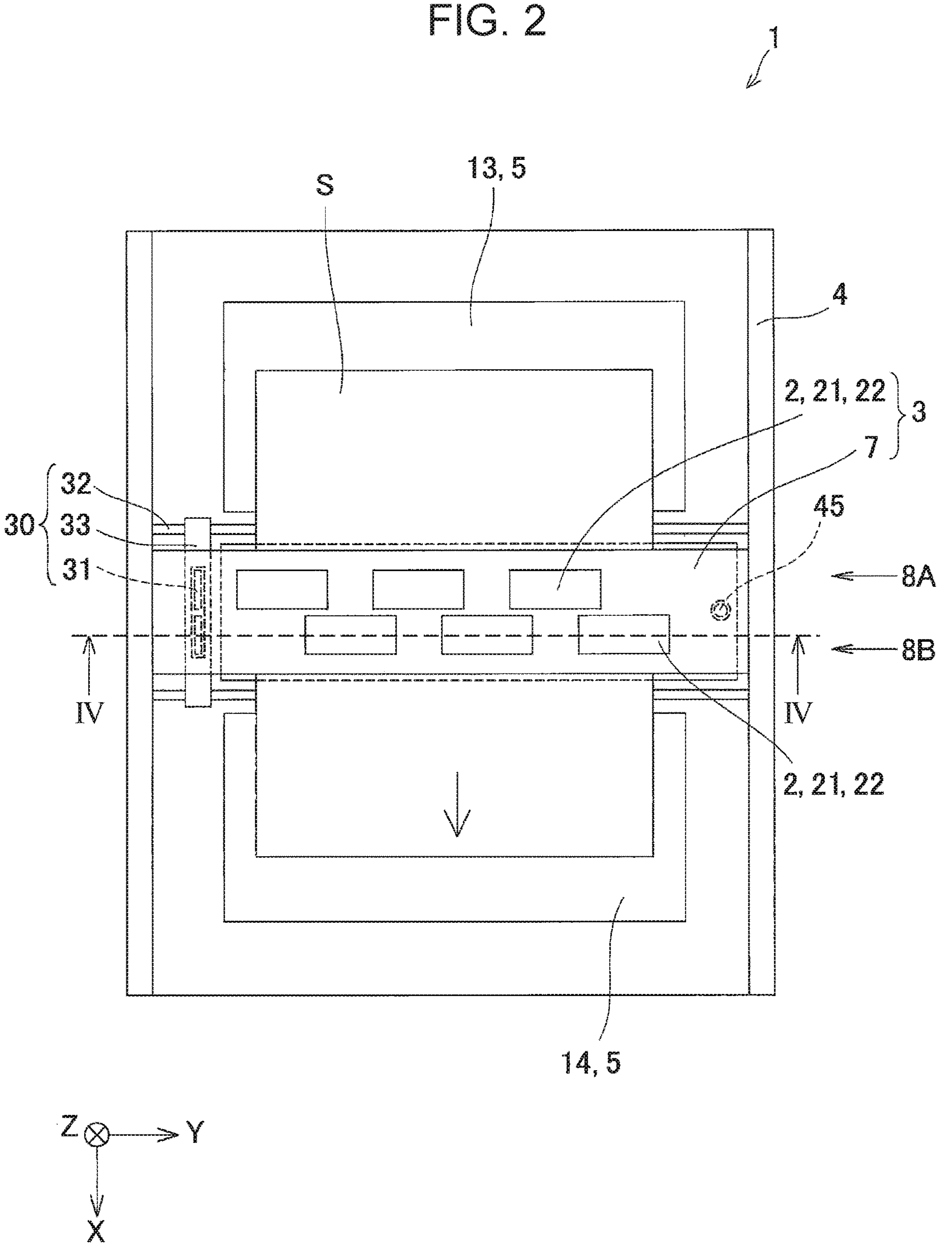
FIG. 2 is a plan view of the recording apparatus according to Embodiment 1 of the present disclosure.
Figure 3:
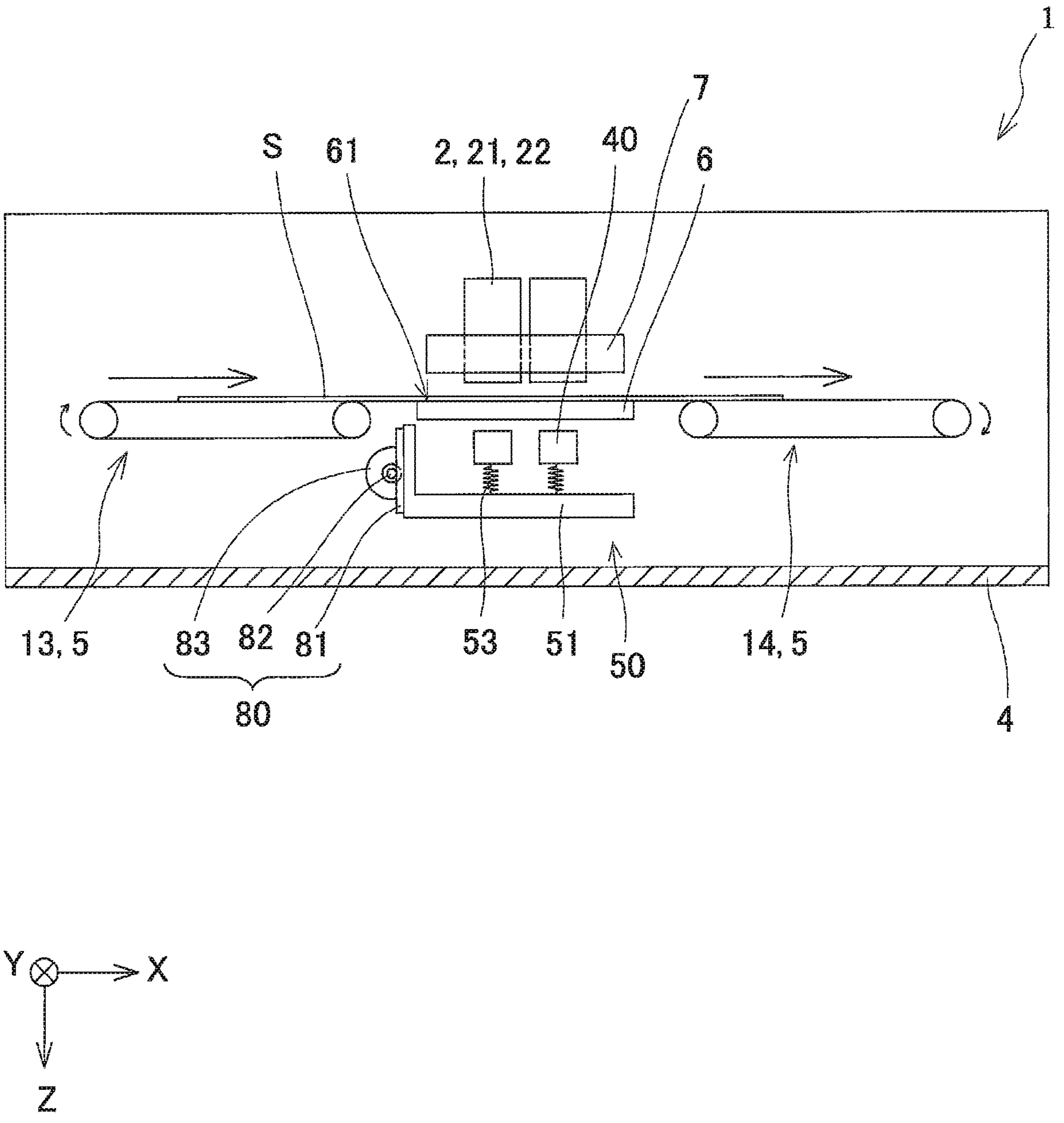
FIG. 3 is a side view illustrating a schematic configuration of the recording apparatus according to Embodiment 1 of the present disclosure.
Figure 4:
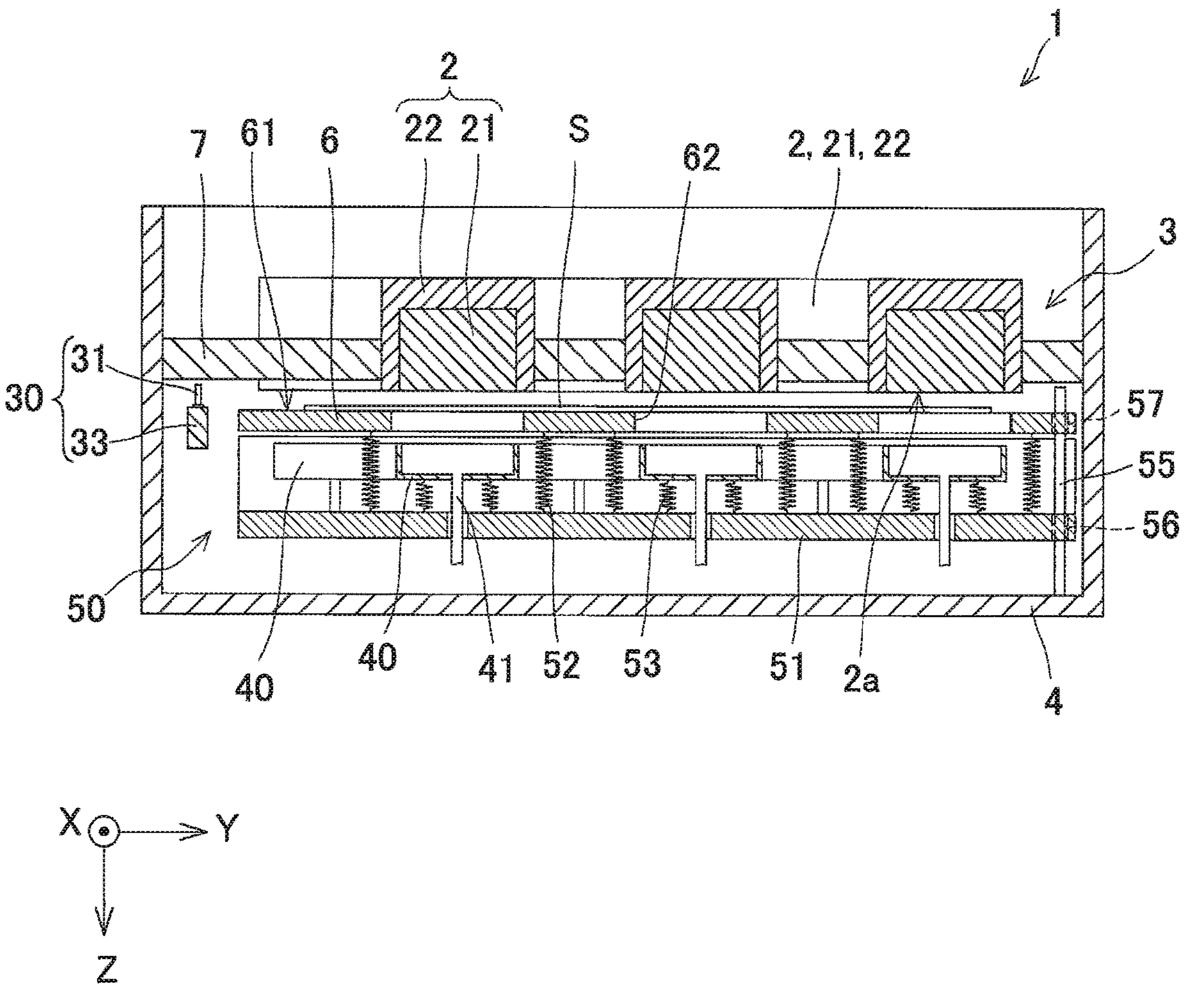
FIG. 4 is a sectional view of the recording apparatus according to Embodiment 1 of the present disclosure.
Figure 5:
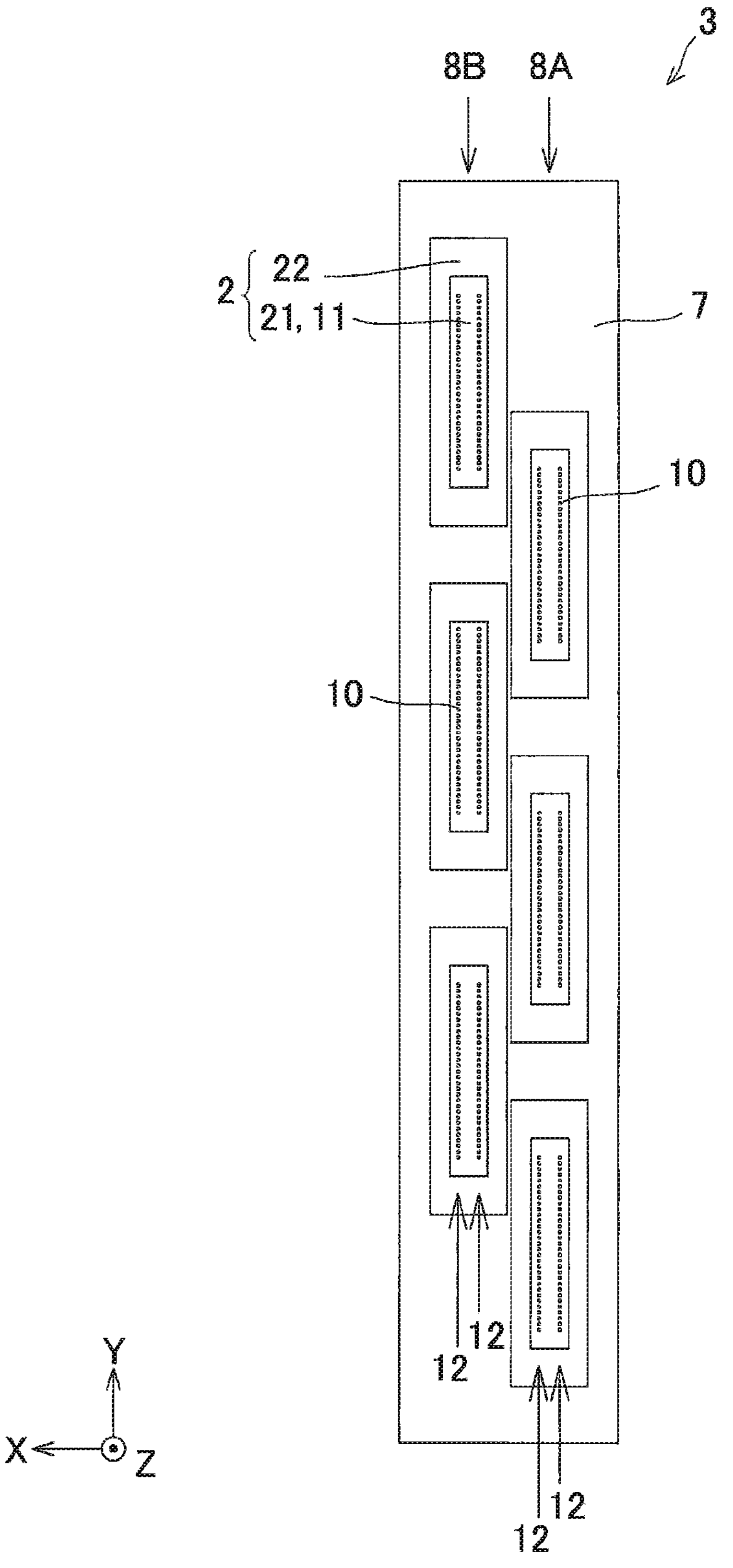
FIG. 5 is a plan view illustrating a head unit according to Embodiment 1 of the present disclosure.
Figure 6:
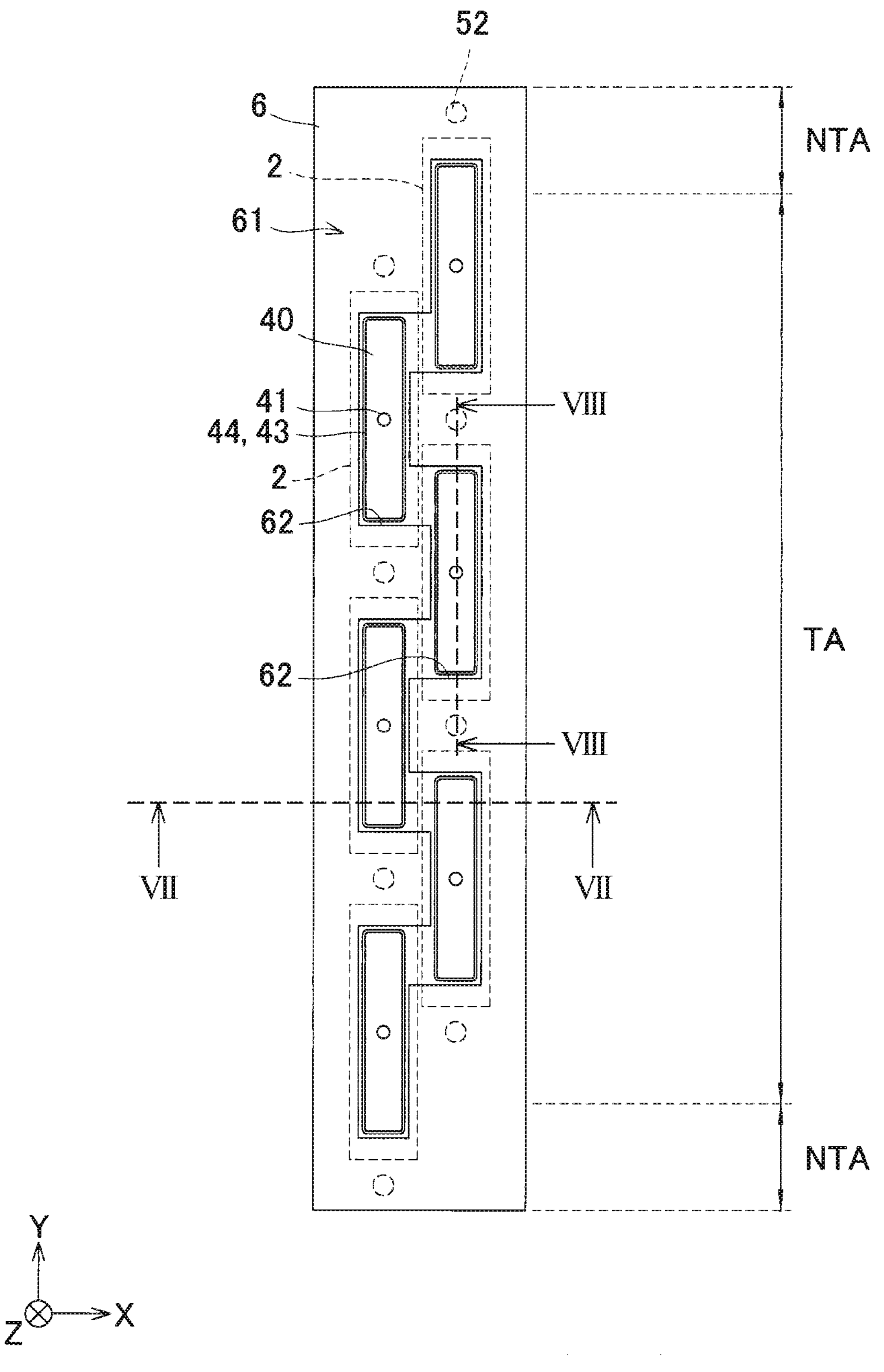
FIG. 6 is a plan view of a platen portion of the recording apparatus according to Embodiment 1 of the present disclosure.
Figure 7:
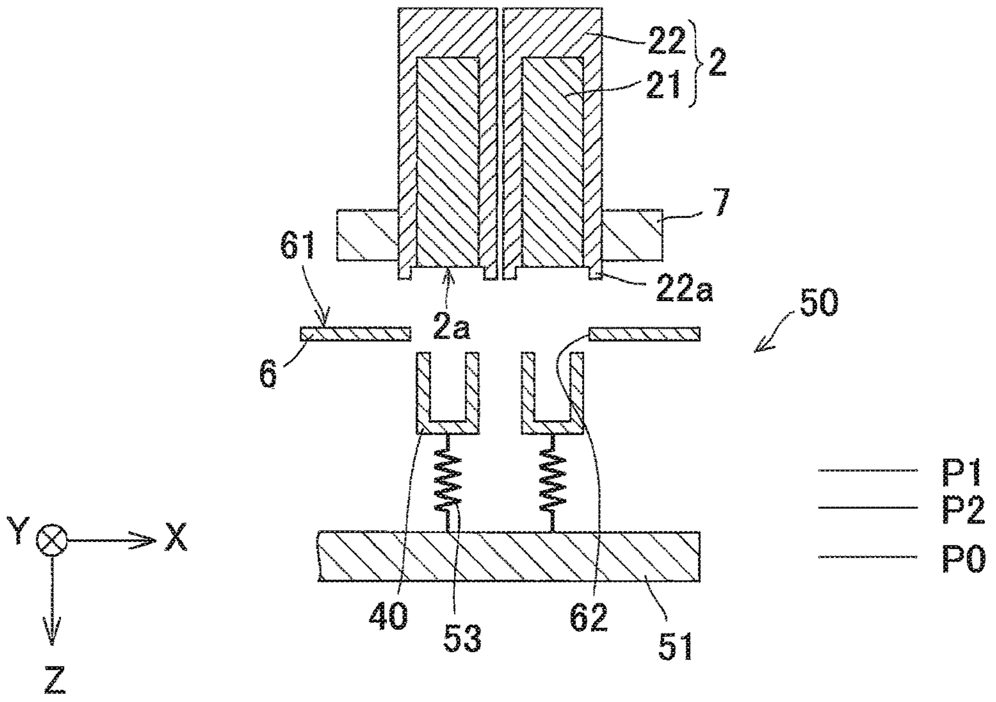
FIG. 7 is a sectional view illustrating a coupling member according to Embodiment 1 of the present disclosure.
Figure 8:
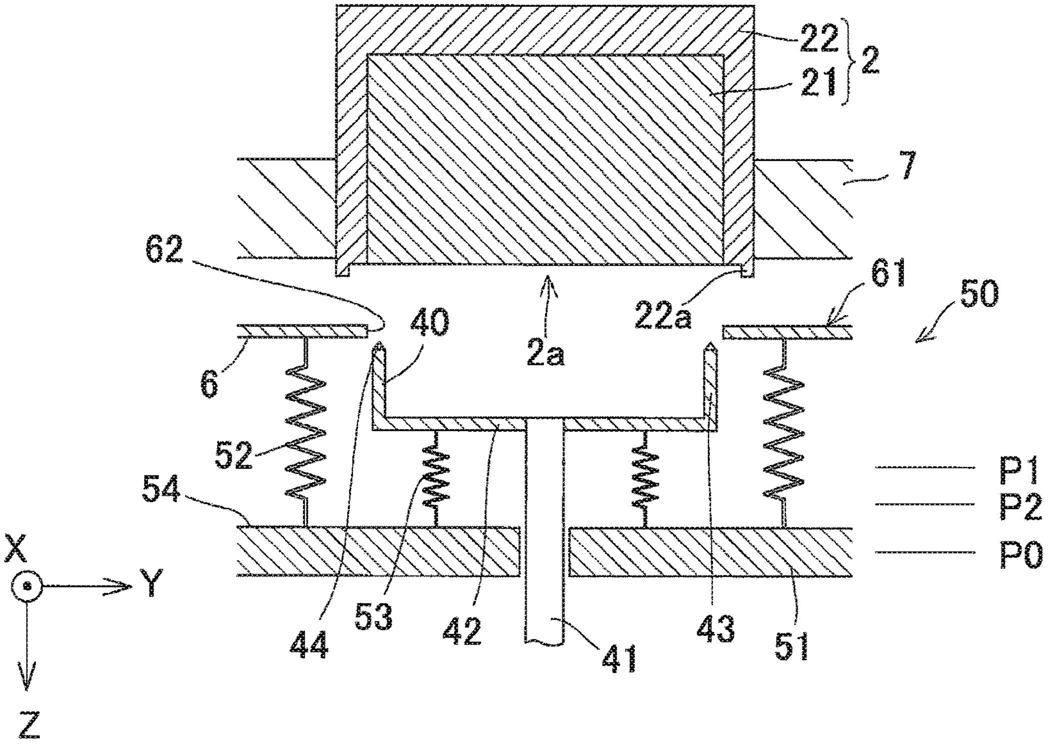
FIG. 8 is a sectional view illustrating the coupling member according to Embodiment 1 of the present disclosure.

FIG. 1 is a schematic perspective view illustrating an ink jet recording apparatus, which is an example of a "liquid ejecting apparatus" of the present disclosure. FIG. 2 is a plan view illustrating a schematic configuration of the ink jet recording apparatus. In addition, FIG. 3 is side view illustrating a schematic configuration of the ink jet recording apparatus, and FIG. 4 is a sectional view corresponding to line IV-IV of FIG. 2. In addition, FIG. 5 is a plan view illustrating a head unit according to Embodiment 1, and FIG. 6 is a plan view illustrating a platen portion of the recording apparatus according to Embodiment 1. Moreover, FIGS. 7 and 8 are sectional views illustrating a coupling member, FIG. 7 is a view corresponding to line VII-VII of FIG. 6, and FIG. 8 is a view corresponding to line VIII-VIII of FIG. 6.

As illustrated in the drawings, an ink jet recording apparatus 1 of the present embodiment is a so-called line-type recording apparatus that includes an ink jet recording head unit (hereinafter, also simply referred to as "head unit") 3 including a plurality of ink jet recording heads 2 and performs printing by transporting a medium S such as paper or a recording sheet in the X-axis direction and ejecting ink, which is an example of a "liquid", in the +Z direction, which is an example of an "ejecting direction", toward the medium S from the recording heads 2. That is, the "ejecting direction" is a direction along the Z-axis, and the Z-axis of the present embodiment is an example of a "first axis". Note that the "ejecting direction" is not limited to the direction along the Z-axis, and may be, for example, a direction along the X-axis. The recording apparatus 1 includes the head unit 3, a main frame 4, a transport unit 5 that transports the medium S, and a platen 6, which is an example of a "medium supporting member" that supports the medium S.

The head unit 3 includes the plurality (six in the present embodiment) of recording heads 2 and a head supporting member 7 that supports the plurality of recording heads 2.

In the present embodiment, each of the recording heads 2, which is an example of a "liquid recording head", includes a head chip 21 including a path through which ink flows including a nozzle 10, and a holder 22 holding the head chip 21 inside. Note that the configuration of the head chip 21 is not particularly limited and a known configuration may be adopted, and thus a detailed description will be omitted here.

The plurality of recording heads 2 is arranged zigzag in the Y-axis direction in the head supporting member 7 and is fixed to the head supporting member 7. In more detail, the holder 22 that holds the head chip 21 of each recording head 2 is fixed to the head supporting member 7.

The head supporting member 7 is provided with two lines 8 (8A and 8B) in which the plurality of recording heads 2 is arranged in a line in the Y-axis direction orthogonal to the X-axis direction, which is a transport direction of the medium S. That is, in the head supporting member 7, the two lines 8A and 8B in which the plurality (three in the present embodiment) of recording heads 2 is arranged in a line are arranged in parallel in the X-axis direction. In addition, the recording heads 2 configuring one line 8A and the recording heads 2 configuring the other line 8B are arranged while being displaced from each other in the Y-axis direction.

Here, the head chip 21 that configures each recording head 2 includes, as illustrated in FIG. 5, a nozzle plate 11 provided with a plurality of the nozzles 10. That is, each of the plurality of recording heads 2 included in the head unit 3 is provided with the plurality of nozzles 10 formed on an ejecting surface 2*a*, which is a surface including a surface of the nozzle plate 11. In the present embodiment, the nozzle plate 11 of each recording head 2 is provided with two nozzle lines 12 in which the plurality of nozzles 10 is arranged in a line in the Y-axis direction. The recording heads 2 adjacent to each other in the X-axis direction are arranged such that the nozzles 10 at an end of the nozzle lines 12 of one of the adjacent recording heads 2 and the nozzles 10 at an end of the nozzle lines 12 of the other one of the adjacent recording heads 2 are located at the same position in the Y-axis direction. As a result, printing can be performed over a whole area in a width direction of the medium S, which is the Y-axis direction. That is, the head unit 3 having the plurality of recording heads 2 configures a line head having a length equal to or more than the width in the Y-axis direction of the medium S.

Note that the ejecting surface 2*a* of the present embodiment is configured by a surface of the nozzle plate 11 facing the +Z direction, but the configuration is not limited to this aspect. For example, when each recording head 2 further includes a cover member having an exposure opening portion that exposes the plurality of nozzles 10 formed in the nozzle plate 11 to the outside and the head chip 21 is disposed between the holder 22 and the cover member, the "ejecting surface" includes a surface of the cover member facing the +Z direction and a surface of the nozzle plate 11 facing the +Z direction.

Moreover, although not illustrated, an ink storage unit such as an ink tank or an ink cartridge in which ink is stored is coupled to each recording head 2 included in the head unit 3. The ink storage unit may be, for example, held on the head unit 3 or disposed at a position different from a position of the head unit 3 in the main frame 4.

In addition, in the present embodiment, the head unit 3 has an exemplary configuration in which the two lines 8 in each of which the recording heads 2 are arranged in a line are arranged in parallel in the X-axis direction, but the configuration of the head unit 3 is not limited thereto. The head unit 3 may have a configuration in which three or more lines 8 are arranged in parallel in the X-axis direction, or a configuration including one line 8. In addition, a configuration in which the two nozzle lines 12 are provided in each recording head 2 is exemplified, but the configuration of the recording head 2 is not limited thereto. The recording head 2 may include, for example, one nozzle line 12.

The transport unit 5 is configured to transport the medium S and includes a first transport unit 13 and a second transport unit 14 provided on respective sides of the head unit 3 in the X-axis direction, which is the transport direction of the medium S.

The first transport unit 13 is configured with a driving roller 13*a*, a driven roller 13*b*, and a transport belt 13*c* wound around the driving roller 13*a* and the driven roller 13*b*. In addition, similarly to the first transport unit 13, the second transport unit 14 is configured with a driving roller 14*a*, a driven roller 14*b*, and a transport belt 14*c*.

A driving unit such as a driving motor (not illustrated) is coupled to each of the driving rollers 13*a* and 14*a* of the first transport unit 13 and the second transport unit 14, and when the transport belts 13*c* and 14*c* are rotated and driven by a driving force of the driving unit, the medium S is transported upstream and downstream of the head unit 3.

The platen 6, which is the medium supporting member, has a supporting surface 61 that supports the medium S and is provided between the first transport unit 13 and the second transport unit 14 so as to face the head unit 3. The platen 6 supports the medium S transported onto the supporting surface 61 by the first transport unit 13 and the second transport unit 14 at a position facing the head unit 3. The platen 6 is made of a metal plate, a resin plate, or the like having a rectangular cross section, and, although the details will be described later, is configured to be lifted and lowered together with a cap 40.

In the recording apparatus 1 having the above configuration, the medium S is transported onto the supporting surface 61 of the platen 6 by the first transport unit 13, recording operation is performed through ejection of ink in the +Z direction from the nozzles 10 of the recording head 2 toward the medium S supported by the supporting surface 61, and the medium S on which an image is formed with this recording operation is transported out from the top of the platen 6 by the second transport unit 14. The recording operation is an example of "ejection operation".

In addition, the recording apparatus 1 includes a wiping device 30 having a blade member 31, which is an example of a "wiping member" for wiping the ejecting surface 2*a* of each recording head 2. The wiping device 30 performs wiping operation at a predetermined timing such as, for example, when the ejecting surface 2*a* of the recording head 2 is stained with a liquid such as ink by the recording operation, or each time a predetermined amount of printing is performed. The wiping operation is operation in which a tip of the blade member 31 slides and comes into contact with the ejecting surface 2*a* of the recording head 2 so as to perform wiping of a liquid such as ink on the ejecting surface 2*a*.

The wiping device 30 according to the present embodiment includes the blade member 31, two shaft members 32 fixed to the main frame 4, and a holding member 33 provided movably in a shaft direction of the shaft members 32 and holding the blade member 31.

The blade member 31 is configured to wipe the ejecting surface 2*a* of the recording head 2 and made of a plate-like member formed of an elastic member such as rubber or elastomer. The blade member 31 is provided corresponding to each line 8 of the recording heads 2 arranged in parallel in the Y-axis direction. In the present embodiment, since the head unit 3 is provided with the two lines 8A and 8B in which the recording heads 2 are arranged in parallel, the wiping device 30 has the two blade members 31 corresponding to the lines 8A and 8B.

The shaft members 32 are provided in an area between the head unit 3 and the platen 6 in the Y-axis direction orthogonal to the X-axis direction, which is the transport direction of the medium S. The shaft members 32 are disposed so as not to hinder transportation of the medium S. Specifically, the shaft members 32 are provided outside the platen 6 in the X-axis direction and further in the +Z direction than is the platen 6.

The holding member 33 is slidably provided to the two shaft members 32, and, although not illustrated, is configured to move to an appropriate position of the shaft members 32 by a driving force of a driving motor, a pressure pump for feeding oil or the like, an electromagnet, or the like.

The wiping device 30 performs the wiping operation at a predetermined timing. That is, the wiping device 30 performs the wiping operation for wiping the ejecting surface 2*a* of each recording head 2 by moving the holding member 33 that holds the blade members 31 at a predetermined timing along the shaft members 32.

However, for example, during the recording operation, the distance between the recording head 2 and the platen 6 is relatively narrow, and the holding member 33 cannot be moved along the shaft members 32. Although the details will be described later, when the wiping operation is performed, the platen 6 is relatively moved with respect to the recording head 2 such that the distance between the platen 6 and the recording head 2 increases.

Note that in the present embodiment, the wiping device 30 has an exemplary configuration including the blade members 31 that wipe the ejecting surface 2*a* of the recording head 2, but this configuration is merely an example, and the configuration of the wiping device 30 is not limited thereto. For example, the wiping device 30 may include an absorbing member that can absorb ink, instead of the blade members 31. The absorbing member is, for example, a band-shaped member made of a porous member such as sponge or fabric or the like.

As illustrated in FIGS. 3 and 4, the recording apparatus 1 has the cap 40 that comes into contact with the ejecting surface 2*a* of the recording head 2.

The cap 40 is configured to suppress drying of the ink near the nozzles 10 of the recording head 2, for example, when printing is not performed for a long period of time. The cap 40 is provided corresponding to each recording head 2, and is formed to have a size sufficient to cover substantially the entire ejecting surface 2*a* of the recording head 2.

As illustrated in FIG. 8, the cap 40 has a recessed shape including a bottom wall 42 and a side wall 43 projecting from the bottom wall 42 in the −Z direction. As illustrated in FIG. 6, the side wall 43 has an annular shape when viewed in the +Z direction. As illustrated in FIGS. 6 and 8, a tip of the cap 40, that is, an end portion in the −Z direction is provided with a seal member 44 made of a projecting elastic member, and when the seal member 44 comes into contact with the ejecting surface 2*a*, the cap 40 can come into close contact with the recording head 2. Note that in the drawings other than FIGS. 6 and 8, the seal member 44 is not illustrated. As described above, the cap comes into contact with the ejecting surface 2*a* so as to be able to perform capping that forms a closed space to which the plurality of nozzles 10 provided on the ejecting surface 2*a* opens.

In addition, as illustrated in FIG. 8, a suction tube 41 leading to a suction device (not illustrated) configured with a vacuum pump or the like, for example, is coupled to the bottom wall 42 of the cap 40. During the cap closing the ejecting surface 2*a* of the recording head 2 (capping state), the inside of the cap 40 is caused to have a negative pressure by the suction device, thereby suction operation in which the ink is sucked from the nozzles 10 of the recording head 2 being performed at a predetermined timing. With this suction operation, the ink inside the recording head 2 is discharged together with bubbles from the nozzles 10 into the cap 40.

In addition, the cap 40 is used as, for example, a receptacle of ink when idle ejection operation is performed during the recording operation. The idle ejection operation is operation in which, in order to suppress the occurrence of an appropriate amount of ink not being ejected due to clogging in the nozzles 10 of the recording head 2 caused by thickening of ink, mixing of bubbles into the nozzles 10, or the like, ink that does not directly contribute to formation of an image on the medium S is ejected from each nozzle 10 by driving a driving element. The idle ejection operation is an example of “ejection operation”.

Here, the configuration of the “driving element” is not particularly limited. Examples of the configuration include a piezoelectric element and a heating element. The piezoelectric element has a piezoelectric body interposed between electrodes facing each other and is provided together with a vibration plate corresponding to each pressure chamber in communication with the nozzle 10. As the piezoelectric element is deformed based on a driving signal, the vibration plate vibrates, and as the pressure of the ink in the pressure chamber fluctuates, the ink in the pressure chamber is ejected from the nozzle 10. The heating element is disposed in a path in communication with the nozzle 10 and ejects the ink in the path from the nozzle 10 by bubbles generated by heating of the heating element.

During the ejection operation, which is the recording operation and the idle ejection operation, the cap 40 is disposed on an opposite side from the ejecting surface 2*a* of the recording head 2 with respect to the platen 6, that is, further in the +Z direction than is the supporting surface 61 of the platen 6. As will be described later, the cap 40 is configured to move together with the platen 6 in the Z-axis direction and can come into contact with the ejecting surface 2*a* of the recording head 2 by being lifted together with the platen 6 at a predetermined timing.

As illustrated in FIGS. 4 and 6, the platen 6 has an opening portion 62 facing the nozzles 10 of each recording head 2. The opening portion 62 is provided in an area facing each recording head 2. In the present embodiment, the opening portion 62 is continuously formed over areas, of the platen 6, facing the respective recording heads 2. However, the opening portion 62 does not have to be continuously formed, and may be formed independently in an area, of the platen 6, facing each recording head 2.

In addition, as illustrated in FIG. 6, each cap 40 is disposed in the opening portion 62 of the platen 6 when viewed in the Z-axis direction. That is, each cap 40 is disposed so as to be able to pass through the opening portion 62 of the platen 6 when being moved in the Z-axis direction.

On the other hand, the opening portion 62 is formed smaller than the ejecting surface 2*a* of the recording head 2 when viewed in the Z-axis direction. That is, the opening portion 62 is formed into such a size that the recording head 2 is not allowed to enter the opening portion 62. By forming the opening portion 62 to have such a size, transportation of the medium S using the platen 6 can be more stable.

The cap 40 and the platen 6 are coupled by a coupling member 50. As illustrated in FIGS. 7 and 8, the coupling member 50 has a base member 51, a first coupling member 52, and a second coupling member 53. The first coupling member 52 and the second coupling member 53 are provided on a surface, of the base member 51, facing an opposite side to the ejecting direction, that is, a surface 54 facing the −Z direction. In addition, the platen 6 is coupled to the base member 51 by the first coupling member 52. Moreover, the cap 40 is coupled to the base member 51 by the second coupling member 53. That is, the platen 6 is coupled to the cap 40 through the first coupling member 52, the base member 51, and the second coupling member 53.

The first coupling member 52 and the second coupling member 53 are formed of a member extendable in the Z-axis direction, for example, a metal spring such as a coil spring, elastomer, or the like. However, the first coupling member 52 and the second coupling member 53 are not the same member, and the length and spring force thereof are set as required. In addition, the second coupling member 53 does not have to be formed of a member extendable in the Z-axis direction. That is, the cap 40 may be fixed by the second coupling member 53 so as to always have a predetermined distance from the base member 51.

In the present embodiment, as illustrated in FIGS. 6 and 8, the first coupling member 52 is disposed on both sides of each cap 40 in the Y-axis direction. That is, the first coupling member 52 is disposed at the same position as the position of the cap 40 in the X-axis direction. In other words, when viewed in the Y-axis direction, the first coupling member 52 and the cap 40 overlap each other. In this manner, since the first coupling member 52 is disposed in a gap between the adjacent caps 40 in the Y-axis direction, compared to a case where each cap 40 and the first coupling member 52 are disposed at different positions in the X-axis direction, the platen 6 can be made smaller. The platen 6 is coupled to the base member 51 by a plurality of the first coupling members 52. The second coupling member 53 coupled to the cap 40 is provided on both sides of the suction tube 41 in the Y-axis direction. That is, each cap 40 is coupled to the base member 51 by the two second coupling members 53.

In a state in which each first coupling member 52 and each second coupling member 53 are not contracted, that is, in a state in which the first coupling member 52 and the second coupling member 53 have a natural length, each cap 40 is disposed further in the +Z direction than is the supporting surface 61 of the platen 6.

In addition, the recording apparatus 1 includes a moving mechanism 80 that relatively moves the coupling member 50 with respect to the recording head 2 along the Z-axis (see FIG. 3). In the present embodiment, the moving mechanism 80 moves only the coupling member 50 in the Z-axis direction. That is, the moving mechanism 80 lifts and lowers only the coupling member 50 such that the coupling member 50 approaches the fixed recording head 2 or is separated from the recording head 2.

The configuration of the moving mechanism 80 is not particularly limited. For example, the moving mechanism 80 is configured to have a rack and pinion mechanism or the like. For example, the moving mechanism 80 includes a rack 81 provided on a wall surface of the base member 51 extending in the Z-axis direction and a pinion 82 that is engaged with the rack 81, and the pinion 82 is coupled to a driving source 83 such as a motor. As a result, when the pinion 82 is rotated in one direction by the driving source 83, the coupling member 50 is moved in the +Z direction, and when the pinion 82 is rotated in the other direction, the coupling member 50 is moved in the −Z direction. That is, in the present embodiment, the coupling member 50 is reciprocated in the Z-axis direction by the driving source 83 alone, and thus the moving mechanism 80 relatively moves the coupling member 50 with respect to the recording head 2 along the Z-axis.

Note that the head unit 3 supporting the recording head 2 may be reciprocated in the Z-axis direction by the driving source 83 alone, and thus the moving mechanism 80 may relatively move the coupling member 50 with respect to the recording head 2 along the Z-axis. That is, the moving mechanism 80 is sufficient as long as the moving mechanism 80 relatively moves the coupling member 50 with respect to the recording head 2 along the Z-axis by reciprocating only one of the coupling member 50 and the head unit 3 in the Z-axis direction by the driving source 83 alone. As a result, the apparatus configuration can be simplified and reduced in size.

On the bottom surface of the main frame 4, a guide pin 55 is erected as a guide mechanism that guides the movement of the coupling member 50 by the moving mechanism 80. A guide hole 56 through which the guide pin 55 is inserted is formed in the base member 51. Similarly, a guide hole 57 through which the guide pin 55 is inserted is formed in a portion corresponding to a non-transport area NTA of the platen 6 (see FIG. 6) described later (see FIG. 4). In the present embodiment, one guide pin 55 is provided, but two or more guide pins may be provided where necessary. In addition, the configuration of the guide mechanism is not particularly limited and, for example, may have a guide rail and a guide roller that is engaged with the guide rail.

The platen 6 has three areas divided in the Y-axis direction. These three areas are, specifically, a transport area TA in which the medium S is transported and two non-transport areas NTA in which the medium S is not transported. The two non-transport areas NTA are disposed on both outer sides of the transport area TA in the Y-axis direction when viewed in the +Z direction. That is, the supporting surface 61 supports the medium S in the transport area TA, but does not support the medium S in the non-transport areas NTA. In addition, the transport area TA is an area that overlaps the plurality of nozzles 10 provided in the head unit 3 when viewed in the Z-axis direction, and each of the non-transport areas NTA is an area where the plurality of nozzles 10 provided in the head unit 3 does not exist when viewed in the Z-axis direction. That is, in other words, the transport area TA is a recording area where the recording operation is performed, and the non-transport area NTA is a non-recording area where the recording operation is not performed.

Figure 9:
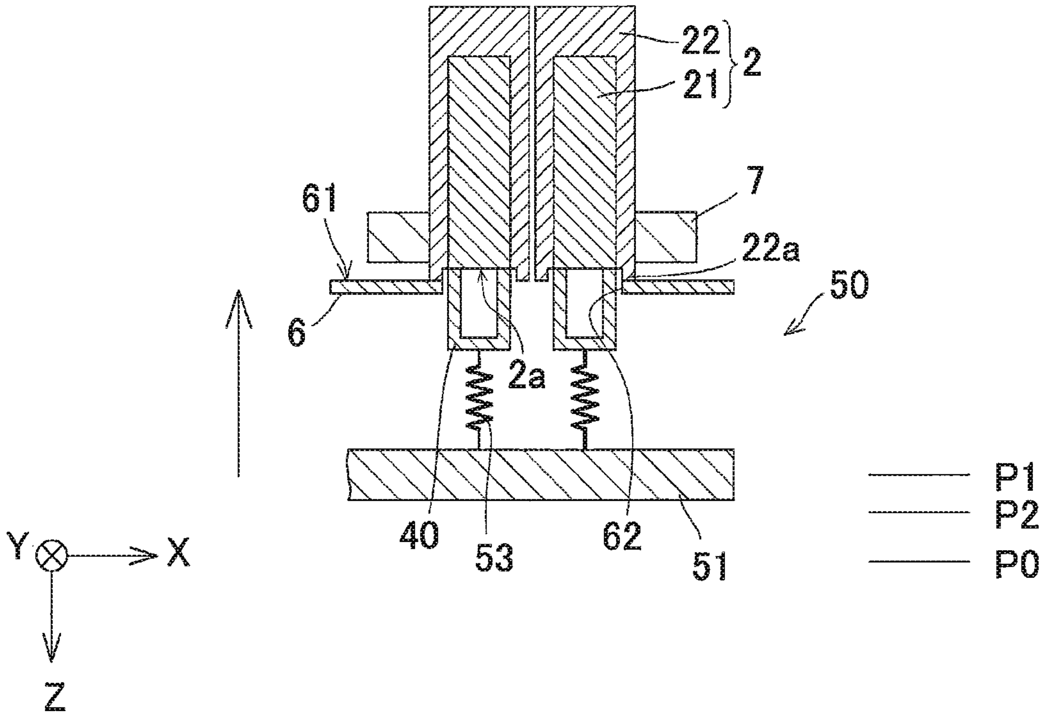
FIG. 9 is a sectional view for explaining a movement of the coupling member according to Embodiment 1 of the present disclosure.

Next, operation of the coupling member 50 will be described. FIGS. 9 to 14 are views for explaining the operation of the coupling member 50 according to Embodiment 1, FIGS. 9, 11, and 13 are sectional views corresponding to line VII-VII in FIG. 6, and FIGS. 10, 12, and 14 are sectional views corresponding to line VIII-VIII in FIG. 6. First, during the ejection operation including the recording operation and the idle ejection operation, as illustrated in FIGS. 7 and 8, the base member 51 of the coupling member 50 is disposed at an initial position P0 in the Z-axis direction. At the initial position P0, a gap through which the medium S can be transported is formed between the recording head 2 and the platen 6, and each cap 40 is disposed further in the +Z direction than is the supporting surface 61 of the platen 6.

Figure 10:
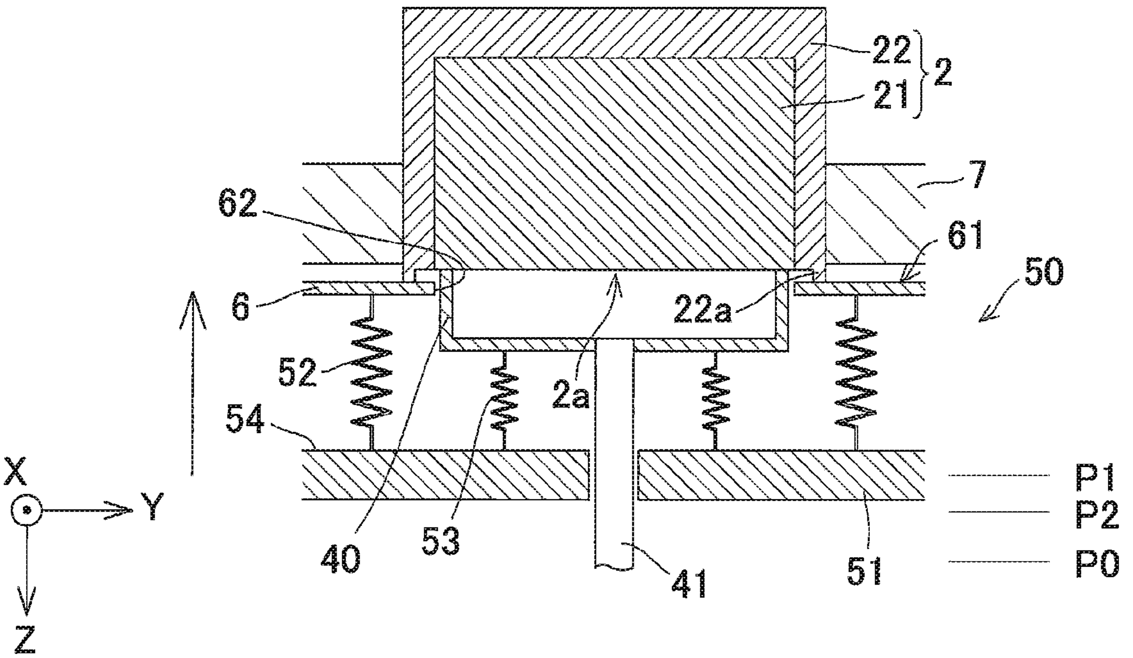
FIG. 10 is a sectional view for explaining a movement of the coupling member according to Embodiment 1 of the present disclosure.
Figure 11:
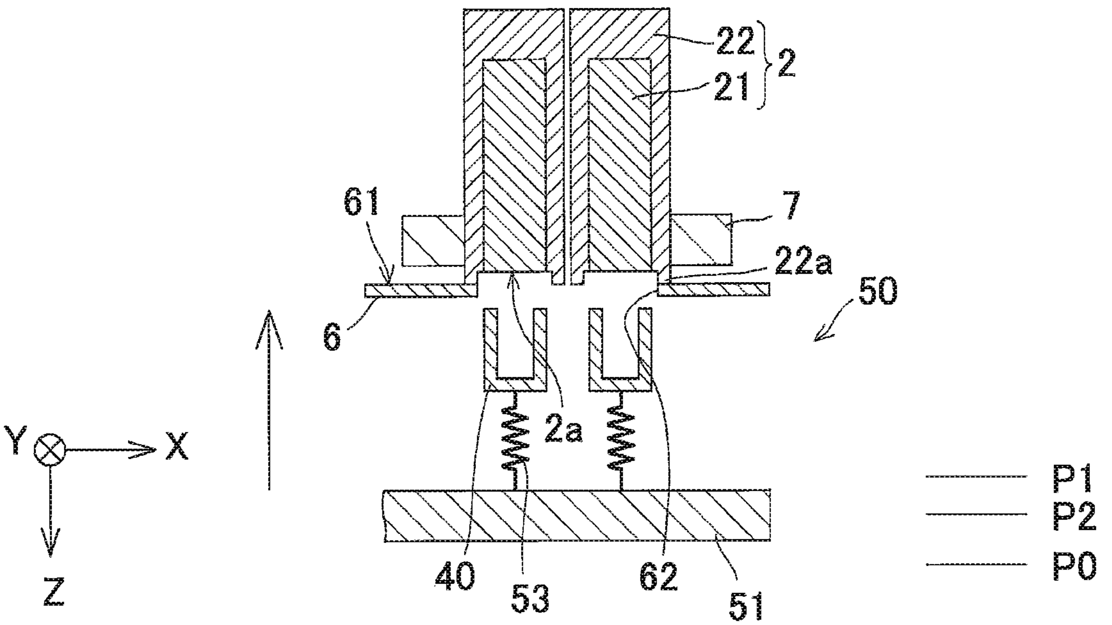
FIG. 11 is a sectional view for explaining a movement of the coupling member according to Embodiment 1 of the present disclosure.

During the capping operation, as illustrated in FIGS. 9 and 10, the base member 51 of the coupling member 50 is moved in the −Z direction from the initial position P0 to a first position P1. That is, the base member 51 is lifted from the initial position P0 to the first position P1. As a result, the platen 6 and the cap 40 are moved in the −Z direction together with the base member 51, and the seal member 44 of the cap 40 comes into contact with the ejecting surface **2*a* of each recording head 2 so as to close the ejecting surface 2*a***.

Figure 12:
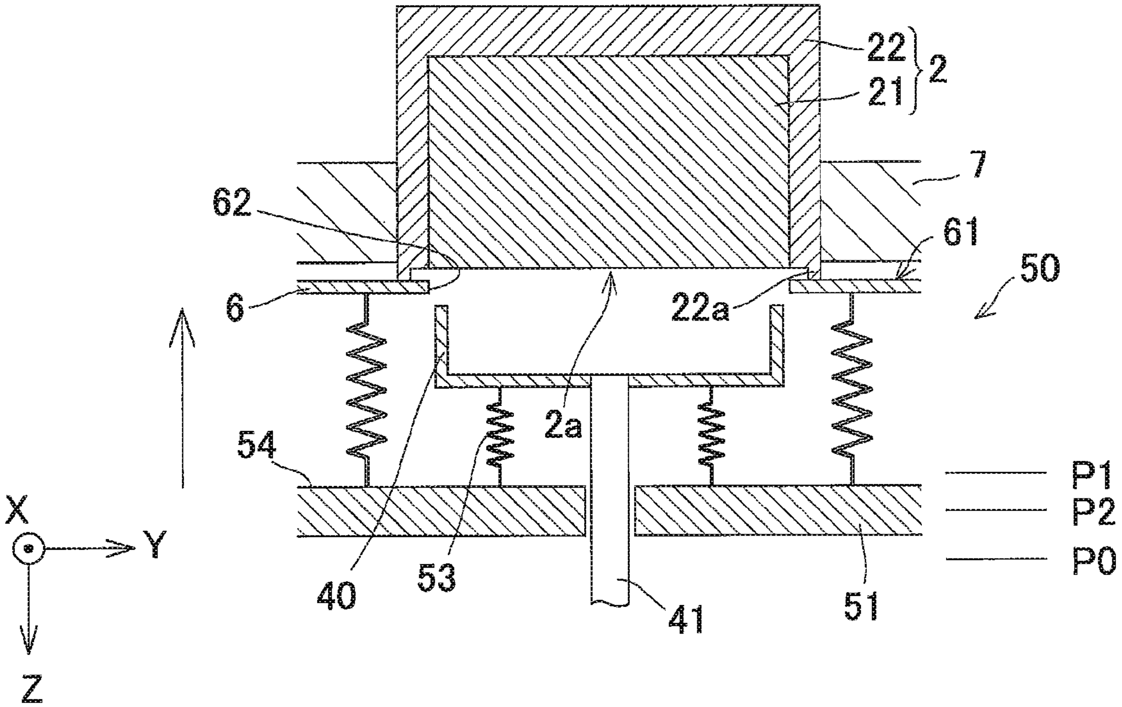
FIG. 12 is a sectional view for explaining a movement of the coupling member according to Embodiment 1 of the present disclosure.
Figure 13:
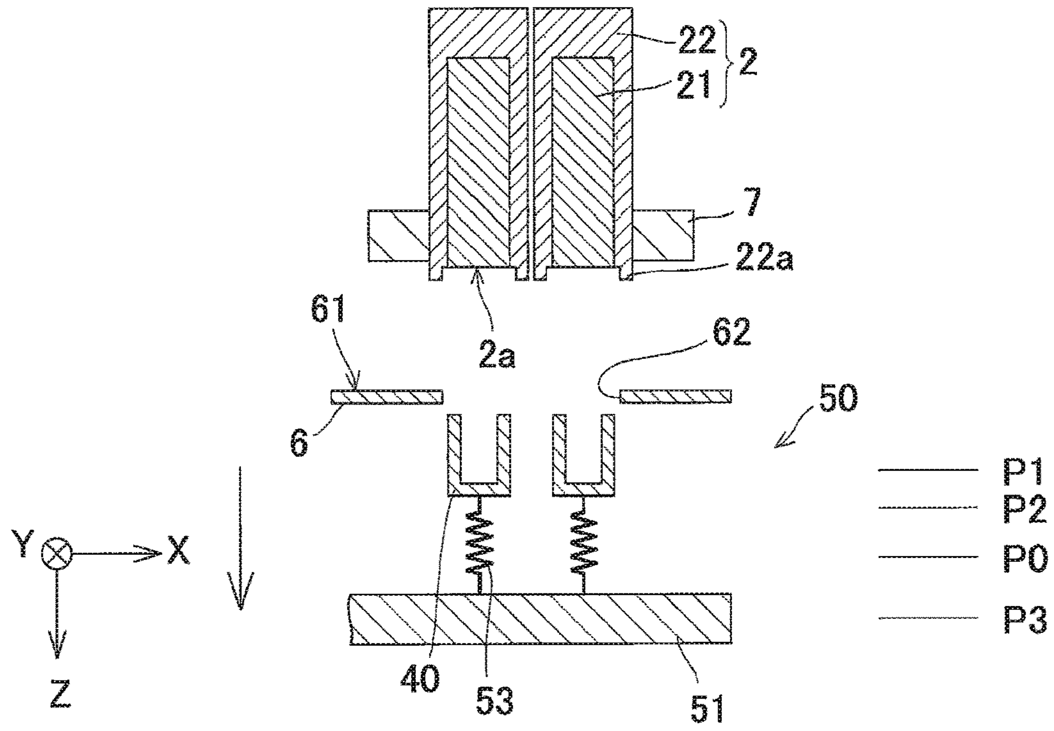
FIG. 13 is a sectional view for explaining a movement of the coupling member according to Embodiment 1 of the present disclosure.

In more detail, when the base member 51 is lifted from the initial position P0, as illustrated in FIGS. 11 and 12, at the point where the base member 51 is lifted to the second position P2, the platen 6 comes into contact with a “facing member”. The “facing member” is any one of the recording head 2, the head supporting member 7, and the main frame 4 and is a member facing the platen 6 in the Z-axis direction. The “facing member” according to the present embodiment is the holder 22 forming a part of the recording head 2, and the platen 6 comes into contact with the holder 22.

An outer peripheral portion of the holder 22 is provided with an outer peripheral rib **22*a* that projects further in the +Z direction than does the ejecting surface 2*a* of the recording head 2. The outer peripheral rib 22*a* projects in the +Z direction by approximately 0.1 mm with respect to the ejecting surface 2*a*. Therefore, the platen 6 does not come into contact with the ejecting surface 2*a* of the recording head 2 and comes into contact with the outer peripheral rib 22***a* of the holder 22. As a result, deformation of the ejecting surface 2*a* of the recording head 2 due to a contact of the platen 6 with the ejecting surface 2*a* and peeling of a water repellent film formed on the ejecting surface 2*a* can be suppressed.

Note that the outer peripheral rib 22*a* of the present embodiment is provided as a part of the holder 22, which is a separate body from the ejecting surface 2*a*, but the outer peripheral rib 22*a* may be provided as a part of the nozzle plate 11 forming the ejecting surface 2*a* by projecting in the +Z direction from an outer peripheral portion of the ejecting surface 2*a*. In addition, as described above, when the ejecting surface 2*a* is configured with the nozzle plate 11 and a cover member, the outer peripheral rib 22*a* may be provided as a part of the cover member.

By the contact of the outer peripheral rib 22*a* with the platen 6, the movement of the platen 6 in the −Z direction is regulated. However, as the first coupling member 52 coupling the platen 6 to the base member 51 is contracted, the base member 51 is further lifted together with the cap 40. By the lifting, the cap 40 passes through the opening portion 62 of the platen 6 and moves further in the −Z direction than does the supporting surface 61 of the platen 6. Then, as illustrated in FIGS. 9 and 10, when the base member 51 is lifted to the first position P1, the cap 40 comes into contact with the ejecting surface 2*a* of each recording head 2.

Figure 14:
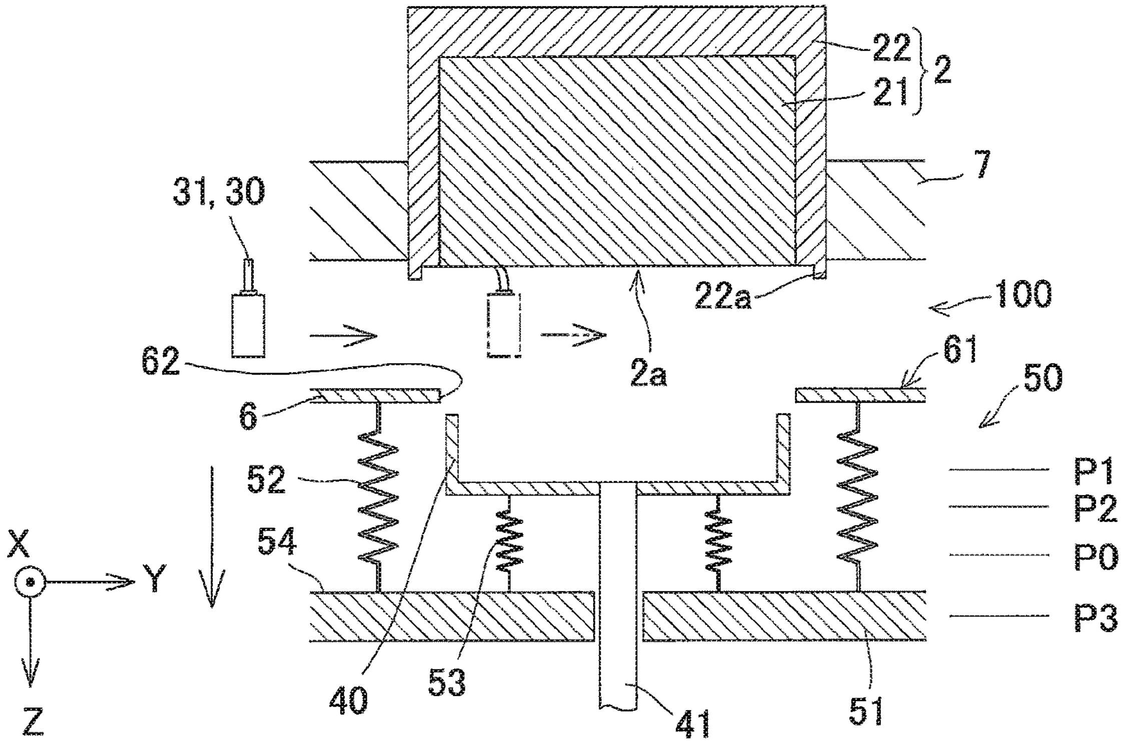
FIG. 14 is a sectional view for explaining a movement of the coupling member according to Embodiment 1 of the present disclosure.

In addition, during the wiping operation, as illustrated in FIGS. 13 and 14, the base member 51 of the coupling member 50 is moved in the +Z direction, for example, from the initial position P0 to a third position P3. That is, the base member 51 is lowered from the initial position P0 to the third position P3. As a result, the platen 6 and the cap 40 are moved in the +Z direction together with the base member 51, and a space 100 having a predetermined size is formed between the ejecting surface 2*a* of the recording head 2 and the platen 6.

The wiping device 30 performs the wiping operation in this state. That is, the wiping device 30 moves each blade member 31 in the Y-axis direction in the space 100 formed by the movement of the coupling member 50 (see FIG. 14) to wipe the ejecting surface 2*a* of the recording head 2 by the blade member 31.

As described above, the recording apparatus 1 (liquid ejecting apparatus) of the present embodiment includes the recording head 2 (liquid ejecting head) having the ejecting surface 2*a* including each nozzle 10 that ejects ink (liquid) in the +Z direction (ejecting direction) along the Z-axis (first axis) toward the medium S, the platen 6 (medium supporting member) that has the supporting surface 61 supporting the medium S and that has the opening portion 62 facing the nozzle 10, the cap 40 that is disposed in the opening portion 62 when viewed in the +Z direction, the coupling member 50 that has the base member 51 and the first coupling member 52 coupling the base member 51 to the platen 6 and configured to extend/contract in a direction along the Z-axis and that couples the platen 6 to the cap 40, and the moving mechanism 80 that causes relative movement of the coupling member 50 with respect to the recording head 2 along the Z-axis.

In addition, the cap 40 is disposed on an opposite side from the ejecting surface 2*a* with respect to the supporting surface 61 during the ejection operation in which the recording head 2 ejects ink toward the medium S.

In addition, the capping operation in which the cap 40 comes into contact with the ejecting surface 2*a* through the opening portion 62 is performed when the platen 6 comes into contact with the facing member by the relative movement of the base member 51 approaching the recording head 2 and the first coupling member 52 is contracted.

With such a configuration, when the above relative movement is performed in the Z-axis direction for the capping operation, even if the platen 6 comes into contact with the recording head 2, the first coupling member 52 is contracted, and only the cap 40 can thus be brought close to the ejecting surface 2*a* of the recording head 2 through the opening portion 62 of the platen 6. Therefore, while the restriction of the positional relationship between the platen 6 and the recording head 2 is reduced, the capping operation can be appropriately performed. In addition, the apparatus configuration can be simplified and reduced in size.

The facing member is the recording head 2, and the recording head 2 has the outer peripheral rib 22*a* projecting in the +Z direction from the ejecting surface 2*a* in the outer peripheral portion of the ejecting surface 2*a*, and when the capping operation is performed and the outer peripheral rib 22*a* comes into contact with the platen 6, the first coupling member 52 is contracted. As a result, deformation of the ejecting surface 2*a* due to a contact of the platen 6 with the ejecting surface 2*a* of the recording head 2 and peeling of a water repellent film formed on the ejecting surface 2*a* can be suppressed.

The blade member 31 (wiping member) is further included. The coupling member 50 is relatively moved by the moving mechanism 80 such that the base member 51 is separated from the recording head 2. The space 100 is formed between the platen 6 and the ejecting surface 2*a*, and the wiping operation in which the ejecting surface 2*a* is wiped is performed in the space 100 as the blade member 31 is relatively moved along the ejecting surface 2*a* with respect to the ejecting surface 2*a*. Similarly to the capping operation is performed, a space for performing the wiping operation can be ensured only by the relative movement of the recording head 2 and the coupling member 50 in the Z-axis direction, and the apparatus configuration can be simplified and reduced in size.

The configuration includes the head unit 3 including the recording head 2 and the head supporting member 7 supporting the recording head 2. The moving mechanism 80 includes the driving source 83 that relatively moves only the coupling member 50 along the Z-axis, and the relative movement of the coupling member 50 with respect to the recording head 2 is performed by the driving source 83 alone. As a result, the apparatus configuration can be further simplified and reduced in size.

The opening portion 62 of the platen 6 is smaller than the ejecting surface 2*a* when viewed in the +Z direction. As a result, the transportation of the medium S can be more stable.

The coupling member 50 includes the second coupling member 53 coupling the base member 51 to the cap 40 and extendable in a direction along the Z-axis direction. As a result, when the capping operation is performed, application of an excessive load to the ejecting surface 2*a* by the cap 40 can be suppressed.

Embodiment 2

Figure 15:
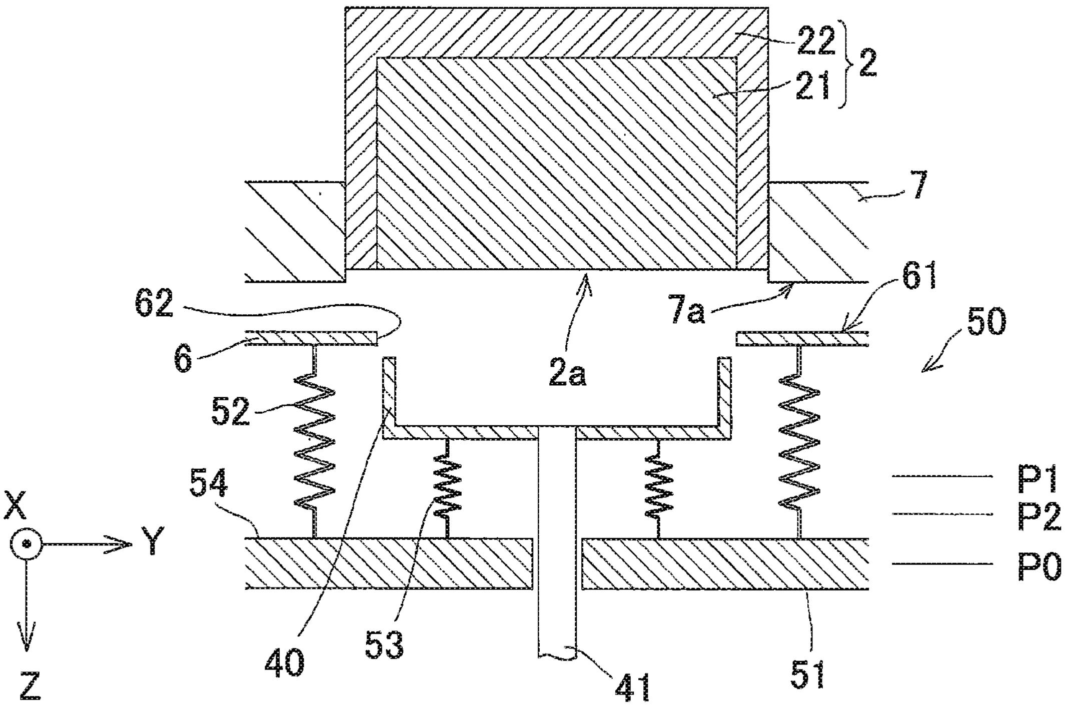
FIG. 15 is a sectional view illustrating a coupling member according to Embodiment 2 of the present disclosure.
Figure 16:
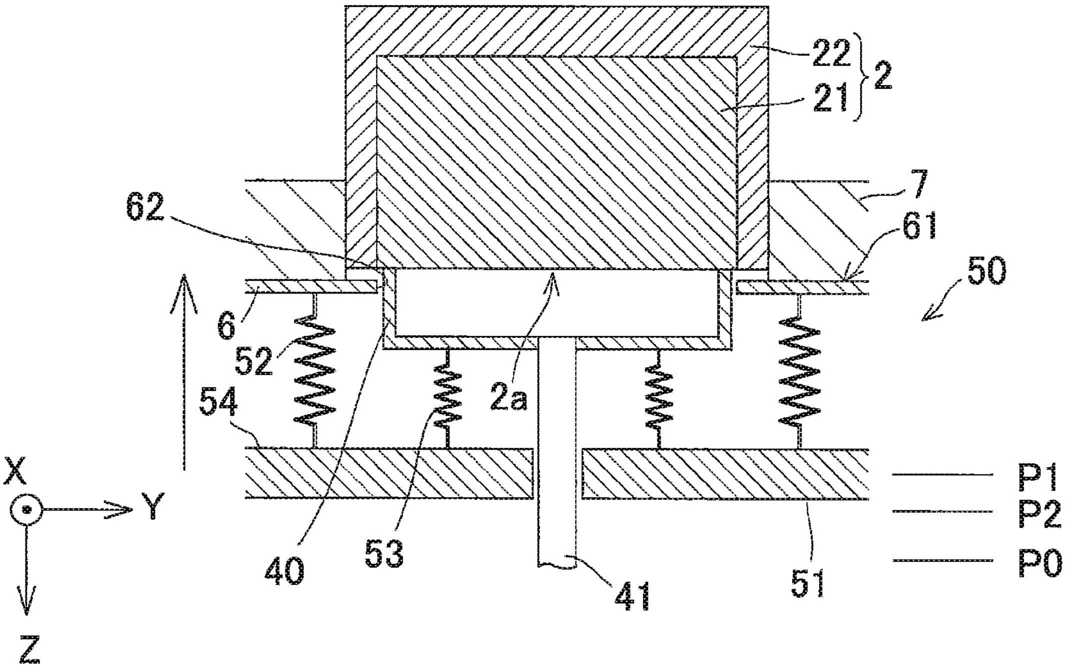
FIG. 16 is a sectional view for explaining a movement of the coupling member according to Embodiment 2 of the present disclosure.

FIG. 15 is a sectional view illustrating a main portion of the recording apparatus 1 according to Embodiment 2. FIG. 16 is a view illustrating a state in which the coupling member 50 is lifted. Note that the same members as those in Embodiment 1 are denoted by the same reference numerals, and redundant descriptions are omitted.

As illustrated in FIG. 15, the present embodiment is different from Embodiment 1 in that an outer peripheral rib is not formed in the outer peripheral portion of the holder 22 forming the recording head 2. Instead, the recording head 2 is fixed to the head supporting member 7 so that the ejecting surface 2*a* is located further in the −Z direction than is a surface 7*a*, of the head supporting member 7, facing the platen 6. In other words, the recording head 2 is fixed to the head supporting member 7 so that the surface 7*a*, of the head supporting member 7, facing the +Z direction is located closer to the platen 6 than is the ejecting surface 2*a*.

That is, in the present embodiment, the "facing member" is the head supporting member 7 supporting the recording head 2, and an end portion over the entire surface of the head supporting member 7 in the +Z direction projects further in the +Z direction than does the ejecting surface 2*a*.

In this configuration, as illustrated in FIG. 16, for example, when the coupling member 50 is moved (lifted) in the −Z direction as the capping operation is performed, the platen 6 comes into contact with the head supporting member 7, thereby the movement of the platen 6 in the −Z direction being regulated. However, although the movement of the platen 6 is regulated, the base member 51 is further lifted together with the cap 40 as the first coupling member 52 is contracted, and the cap 40 comes into contact with the ejecting surface 2*a* of each recording head 2.

At this time, since the platen 6 is in contact with the head supporting member 7, deformation of the ejecting surface 2*a* and peeling of a water repellant film formed on the ejecting surface 2*a* due to a contact of the platen 6 with the ejecting surface 2*a* of the recording head 2 can be suppressed.

Embodiment 3

Figure 17:
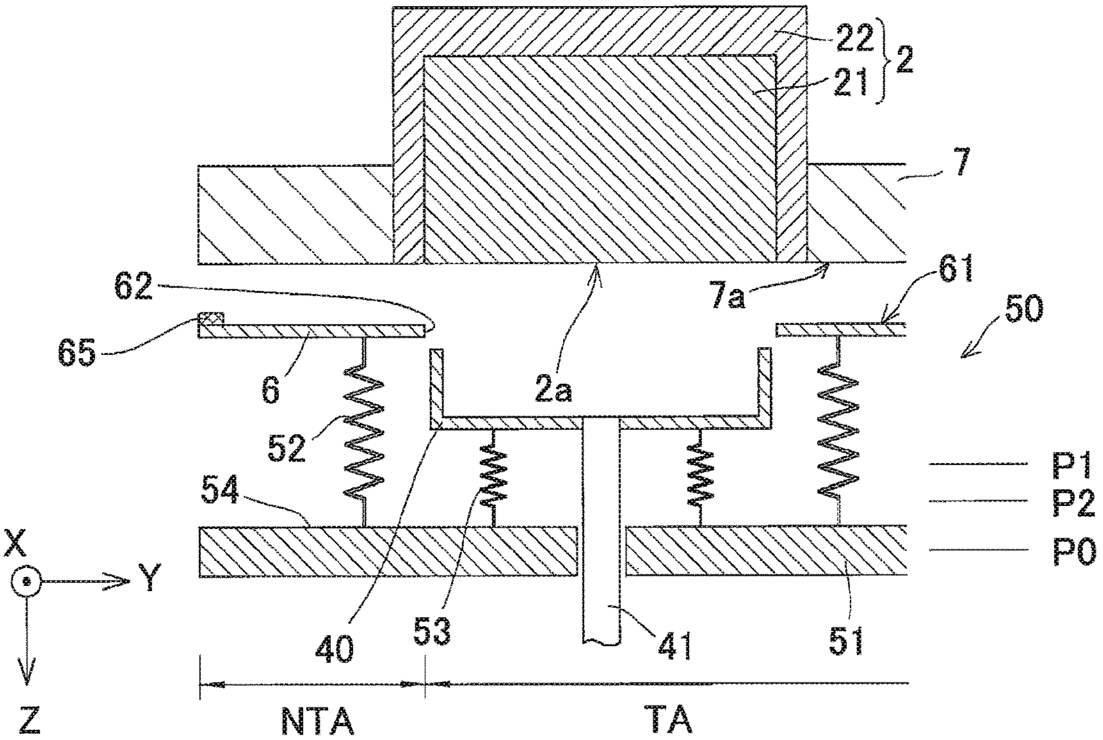
FIG. 17 is a sectional view illustrating a coupling member according to Embodiment 3 of the present disclosure.
Figure 18:
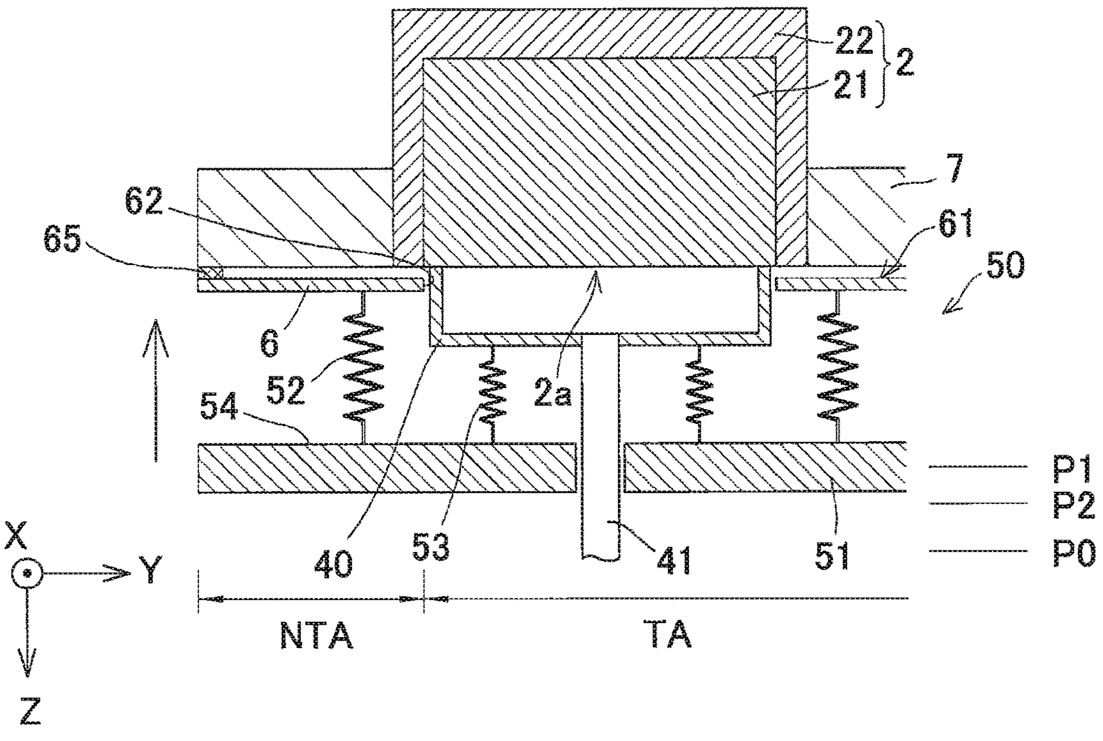
FIG. 18 is a sectional view for explaining a movement of the coupling member according to Embodiment 3 of the present disclosure.

FIG. 17 is a sectional view illustrating a main portion of the recording apparatus 1 according to Embodiment 3. FIG. 18 is a view illustrating a state in which the coupling member 50 is lifted. Note that the same members as those in the above embodiments are denoted by the same reference numerals, and redundant descriptions are omitted. In addition, FIGS. 17 and 18 correspond to sectional views of the recording head 2 disposed in an end portion in the −Y direction among the plurality of recording heads 2 illustrated in FIG. 5, and the cap 40 disposed in an end portion in the −Y direction among the plurality of caps 40 illustrated in FIG. 6.

In Embodiment 2, the recording head 2 is fixed to the head supporting member 7 so that the ejecting surface 2*a* is located further in the −Z direction than is the surface 7*a* of the head supporting member 7 on the platen 6 side, but in the present embodiment, as illustrated in FIG. 17, the recording head 2 is fixed to the head supporting member 7 so that the ejecting surface 2*a* substantially coincides with the surface 7*a* of the head supporting member 7 facing the +Z direction. In addition, the platen 6 is provided with a projecting portion 65 that projects toward the head supporting member 7 further in the −Z direction than does the supporting surface 61. The projecting portion 65 is provided in the non-transport area NTA outside the transport area TA in which the medium S is transported when viewed in the Z axis direction. As illustrated in FIGS. 17 and 18, the projecting portion 65 is provided in the non-transport area NTA disposed in the −Y direction with respect to the transport area TA, but may be provided in the non-transport area NTA disposed in the +Y direction with respect to the transport area TA. In addition, the projecting portion 65 may be provided as a part of the platen 6 by projecting from the supporting surface 61, or may be provided as a separate body from the platen 6 by being disposed on and fixed to the supporting surface 61.

In this configuration, for example, when the coupling member 50 is moved (lifted) in the −Z direction as the capping operation is performed, as illustrated in FIG. 18, the projecting portion 65 of the platen 6 comes into contact with the head supporting member 7 and the movement of the platen 6 in the −Z direction is regulated.

However, although the movement of the platen 6 is regulated, the base member 51 is further lifted together with the cap 40 as the first coupling member 52 is contracted, and the cap 40 comes into contact with the ejecting surface 2*a* of each recording head 2.

At this time, since the projecting portion 65 of the platen 6 comes into contact with the head supporting member 7, the platen 6 does not come into contact with the ejecting surface 2*a* of the recording head 2 and deformation of the ejecting surface 2*a* due to a contact with the platen 6 and peeling of a water repellant film formed on the ejecting surface 2*a* can be suppressed. In addition, since the projecting portion 65 is provided in the non-transport area NTA, the projecting portion 65 does not hinder the transportation of the medium S transported in the transport area TA.

In addition, in the configuration of the present embodiment as well, the same effects as those of the above embodiments can be obtained. For example, while the restriction of the positional relationship between the platen 6 and the recording head 2 is reduced, the capping operation can be appropriately performed. In addition, the apparatus configuration can be simplified and reduced in size.

Embodiment 4

Figure 19:
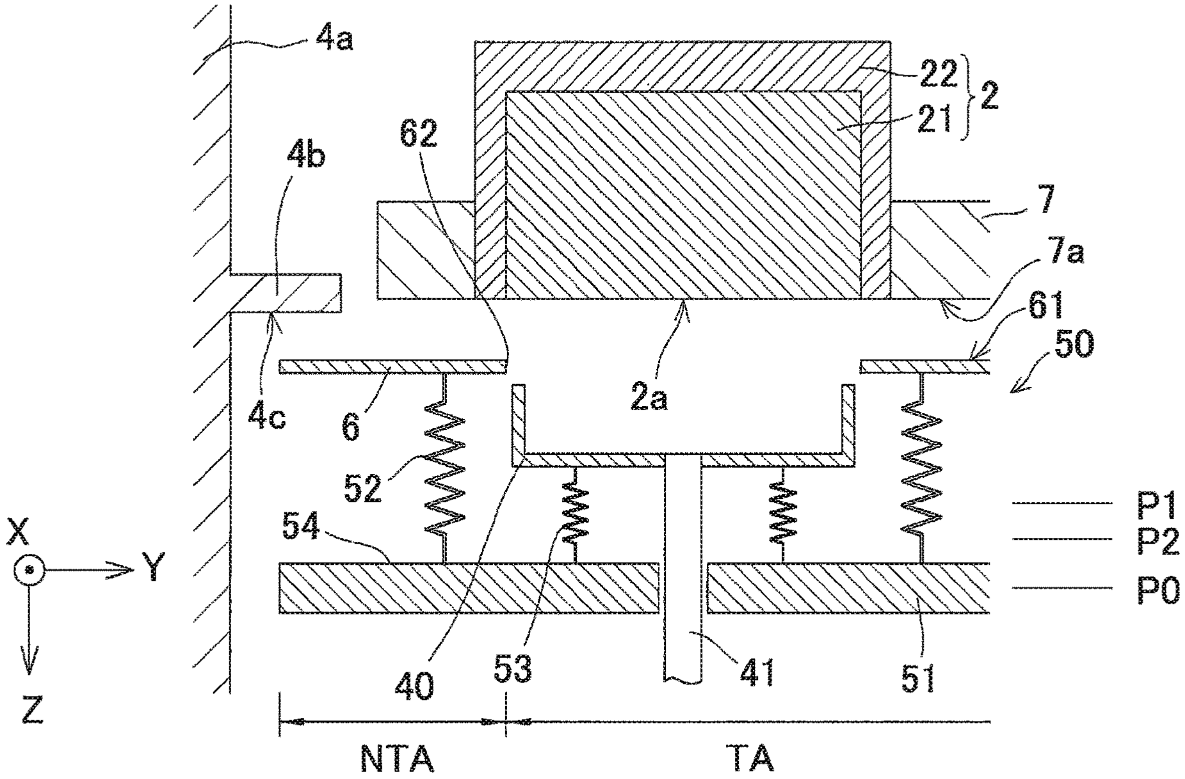
FIG. 19 is a sectional view illustrating a coupling member according to Embodiment 4 of the present disclosure.
Figure 20:
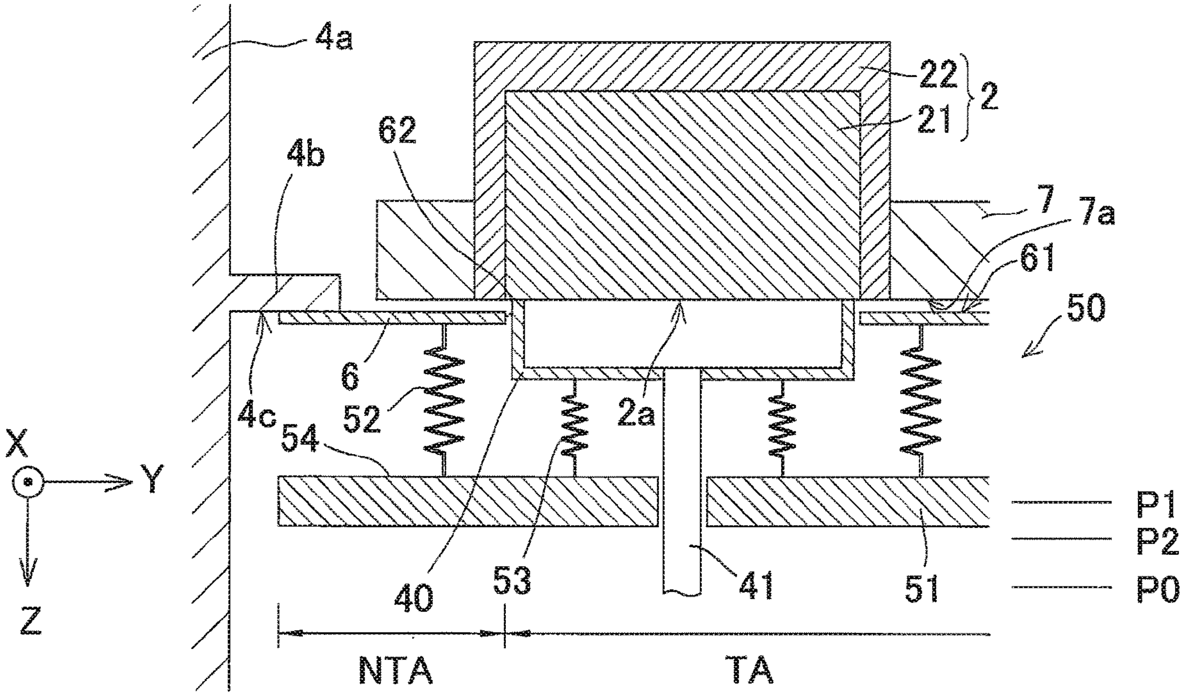
FIG. 20 is a sectional view for explaining a movement of the coupling member according to Embodiment 4 of the present disclosure.

FIG. 19 is a sectional view illustrating a main portion of the recording apparatus 1 according to Embodiment 4. FIG. 20 is a view illustrating a state in which the coupling member 50 is lifted. Note that the same members as those in the above embodiments are denoted by the same reference numerals, and redundant descriptions are omitted. Note that similarly to Embodiment 3, FIGS. 19 and 20 correspond to sectional views of the recording head 2 disposed in an end portion in the −Y direction among the plurality of recording heads 2 illustrated in FIG. 5, and the cap 40 disposed in an end portion in the −Y direction among the plurality of caps 40 illustrated in FIG. 6.

The present embodiment is a modification of the "facing member" facing the platen 6, which is the "medium supporting member". The present embodiment is different from Embodiment 3 in that the main frame 4 is an example of the "facing member", and the projecting portion 65 is not provided in the platen 6.

Specifically, as illustrated in FIG. 19, in a side wall portion 4*a*, extending in the Z-axis direction, of the main frame 4 of the recording apparatus 1, a beam portion 4*b* projecting as a cantilever in the Y-axis direction is provided. The beam portion 4*b* projects to a position facing, in the Z-axis direction, the non-transport area NTA of the platen 6. In addition, a surface 4*c* of the beam portion 4*b* facing the +Z direction is located further in the +Z direction than is the ejecting surface 2*a* of the recording head 2. As illustrated in FIGS. 19 and 20, the beam portion 4*b* is provided in the non-transport area NTA disposed in the −Y direction with respect to the transport area TA, but may be provided in the non-transport area NTA disposed in the +Y direction with respect to the transport area TA.

In this configuration, for example, when the coupling member 50 is moved (lifted) in the −Z direction as the capping operation is performed, as illustrated in FIG. the supporting surface 61 of the platen 6 comes into contact with the beam portion 4*b* of the main frame 4 in the non-transport area NTA, and thus the movement of the platen 6 in the −Z direction is regulated. However, although the movement of the platen 6 in the −Z direction is regulated, the base member 51 is further lifted together with the cap as the first coupling member 52 is contracted, the cap 40 comes into contact with the ejecting surface 2*a* of each recording head 2.

At this time, since the platen 6 is in contact with the beam portion 4*b* of the main frame 4, the platen 6 does not come into contact with the ejecting surface 2*a* of the recording head 2, deformation of the ejecting surface 2*a* due to a contact with the platen 6 and peeling of a water repellant film formed on the ejecting surface 2*a* can be suppressed. In addition, since the beam portion 4*b* is provided in the non-transport area NTA, the beam portion 4*b* does not hinder the recording operation on the medium S transported in the transport area TA by the beam portion 4*b*.

In addition, in the configuration of the present embodiment as well, the same effects as those in the above embodiments can be obtained. For example, while the restriction of the positional relationship between the platen 6 and the recording head 2 is reduced, the capping operation can be appropriately performed. In addition, the apparatus configuration can be simplified and reduced in size.

Note that in the present embodiment, the surface 4*c* of the beam portion 4*b* facing the +Z direction is disposed further in the +Z direction than is the ejecting surface 2*a* of the recording head 2, but the disposition of the beam portion 4*b* is not limited thereto. For example, the beam portion 4*b* may be provided such that the surface 4*c* facing the +Z direction substantially coincides with the ejecting surface 2*a* of the recording head 2, and as in Embodiment 3, the projecting portion 65 projecting in the −Z direction may be provided on the supporting surface 61 of the platen 6. That is, when the capping operation is performed, the projecting portion 65 may be brought into contact with the beam portion 4*b* of the main frame 4, which is an example of the "facing member".

As described in Embodiments 2 to 4 above, the "facing member" is the head supporting member 7 or the main frame 4, and, for example, the platen 6, which is the "medium supporting member", has the projecting portion 65 projecting in the −Z direction, which is an opposite direction from the +Z direction, from the supporting surface 61 in the non-transport area NTA outside the transport area TA where the medium S is transported when viewed in the +Z direction, and when the capping operation is performed, the projecting portion 65 comes into contact with the head supporting member 7 or the main frame 4, whereby the first coupling member 52 is contracted. As a result, the platen 6 does not come into contact with the ejecting surface 2*a* of the recording head 2, and deformation of the ejecting surface 2*a* due to a contact with the platen 6 and peeling of a water repellant film formed on the ejecting surface 2*a* can be suppressed. In addition, the position of the ejecting surface 2*a* and the position of the surface 7*a* of the head supporting member 7 facing the +Z direction can be arranged so as to coincide or substantially coincides in the Z direction so that a step is not generated between the ejecting surface 2*a* and the surface 7*a* of the head supporting member 7, and thus the wiping operation can be easily performed.

Embodiment 5

Figure 21:
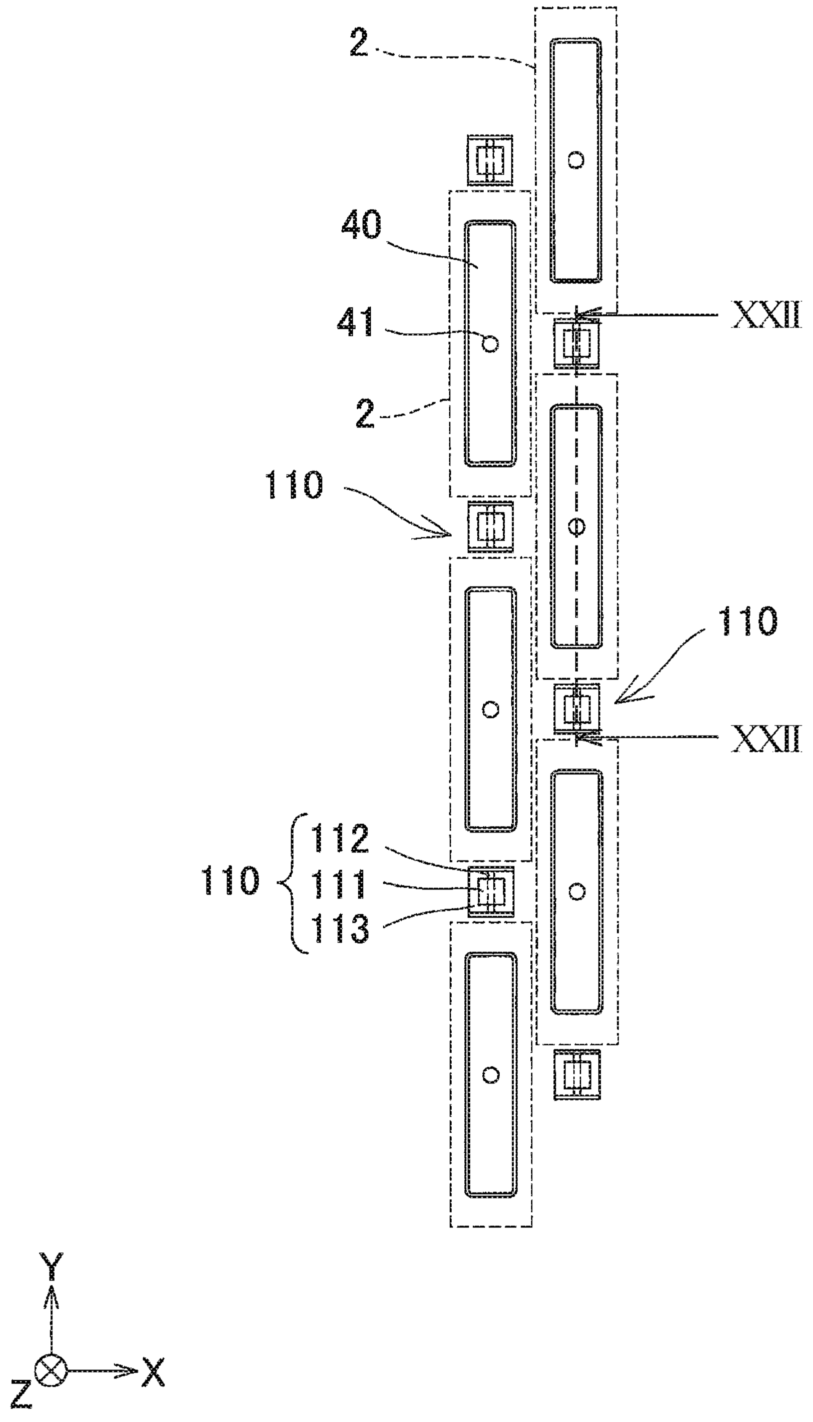
FIG. 21 is a plan view illustrating a medium supporting member according to Embodiment 5 of the present disclosure.
Figure 22:
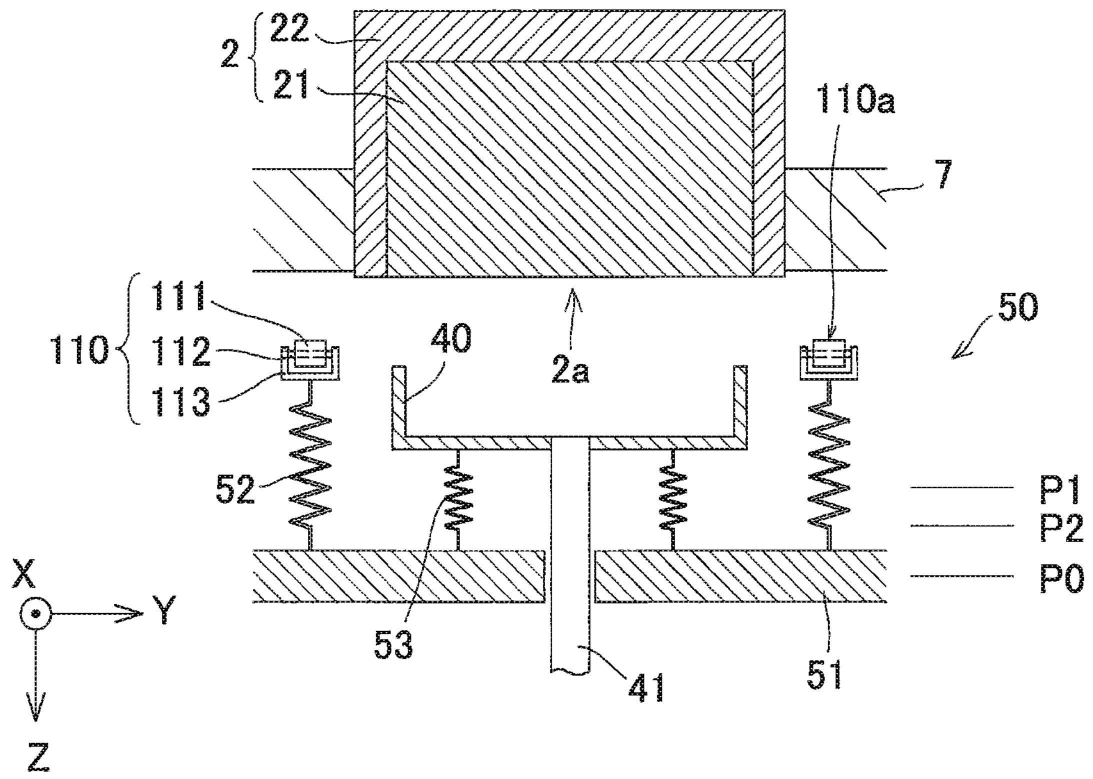
FIG. 22 is a sectional view illustrating a coupling member according to Embodiment 5 of the present disclosure.
Figure 23:
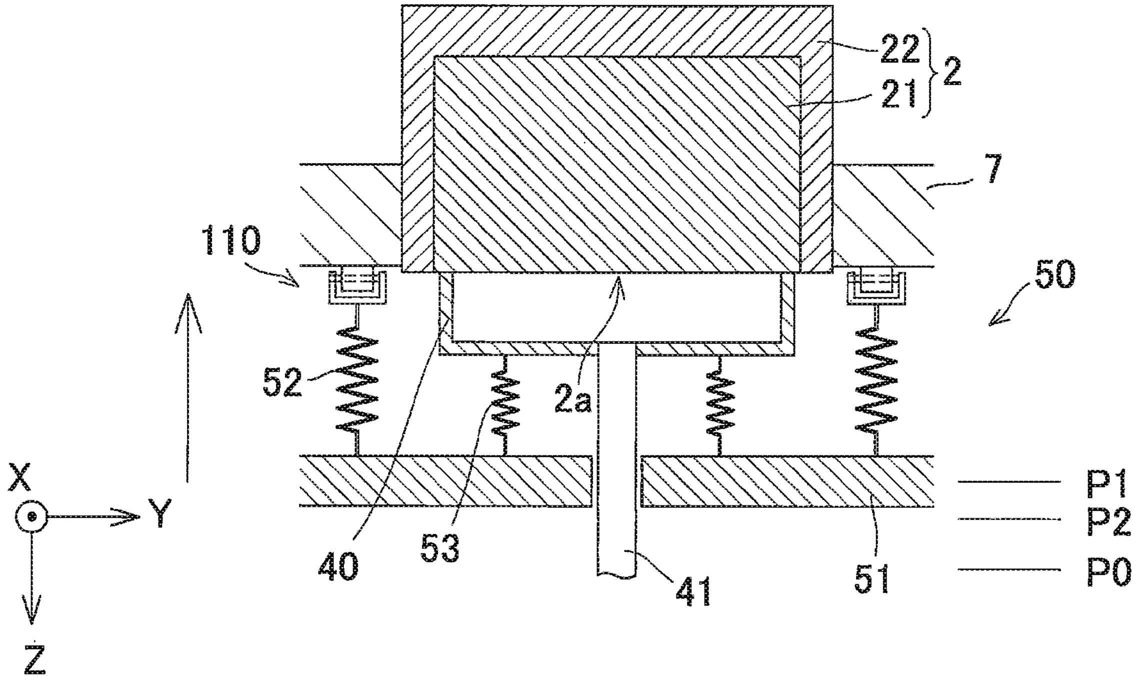
FIG. 23 is a sectional view for explaining a movement of the coupling member according to Embodiment 5 of the present disclosure.

FIGS. 21 to 23 are schematic views for explaining the "medium supporting member" according to Embodiment 5. FIG. 21 is a plan view illustrating the "medium supporting member" according to the present embodiment, and FIG. 22 is a view corresponding to line XXII-XXII of FIG. 21. FIG. 23 is a sectional view for explaining the operation of the coupling member 50. Note that the same members as those in the above embodiments are denoted by the same reference numerals, and redundant descriptions are omitted.

The present embodiment is a modification of the "medium supporting member". The recording apparatus 1 according to the above embodiments includes the platen 6 which is one plate-like member as the "medium supporting member" in an area facing the head unit 3 having the plurality of recording heads 2. On the other hand, the recording apparatus 1 according to the present embodiment includes a plurality of the "medium supporting members" in an area facing the head unit 3. Specifically, as illustrated in FIGS. 21 and 22, the recording apparatus 1 according to the present embodiment includes a plurality of individual supporting members 110 each of which is independent as the "medium supporting member" instead of the platen 6.

The individual supporting members 110 each have a supporting surface 110*a* supporting the medium S and are arranged with a gap therebetween when viewed in the Z-axis direction in an area facing the head unit 3. In the present embodiment, at least six individual supporting members 110 are arranged with a gap therebetween in two lines in the Y-axis direction. Each recording head 2 included in the head unit 3 is disposed so as to be located in the gap between the respective individual supporting members 110 when viewed in the Z-axis direction. In other words, the supporting surface 110*a* of each individual supporting member 110 overlaps at least a part of the head supporting member 7, which is the "facing member", when viewed in the Z-axis direction. In the present embodiment, the supporting surface 110*a* of each individual supporting member 110 overlaps the head supporting member 7 without overlapping the recording head 2 when viewed in the Z-axis direction.

Note that as long as the supporting surface 110*a* is disposed at a position where the supporting surface 110*a* overlaps at least a part of the head supporting member 7 when viewed in the Z-axis direction, the number of the individual supporting members 110 is not particularly limited, and may be seven or more, or five or less.

In the present embodiment, the individual supporting member 110 described above includes a rotation member 111 that rotates around a rotation shaft 112 extending in the Y-axis direction and a holding frame 113 that holds both ends of the rotation shaft 112 of the rotation member 111 and rotatably holds the rotation member 111.

In addition, similarly to the above embodiments, each of the individual supporting members 110 is coupled to the cap 40 by the coupling member 50. That is, the holding frame 113 of each individual supporting member 110 is coupled to the base member 51 by the first coupling member 52. In addition, the cap 40 is coupled to the base member 51 by the second coupling member 53. That is, each individual supporting member 110 is coupled to the cap 40 through the first coupling member 52, the base member 51, and the second coupling member 53.

With such a configuration of the present embodiment, for example, similarly to Embodiment 1, the coupling member 50 is moved (lifted) in the −Z direction by the moving mechanism 80 when the capping operation is performed. Then, as illustrated in FIG. 23, the individual supporting member 110 comes into contact with the head supporting member 7, which is the facing member, thereby the movement of the individual supporting member 110 in the −Z direction being regulated. However, although the movement of the individual supporting member 110 is regulated, the base member 51 is further lifted together with the cap 40 as the first coupling member 52 is contracted, and the cap 40 comes into contact with the ejecting surface 2*a* of each recording head 2.

At this time, since the individual supporting member 110 comes into contact with the head supporting member 7 and does not come into contact with the ejecting surface 2*a* of the recording head 2, deformation of the ejecting surface 2*a* and peeling of a water repellant film formed on the ejecting surface 2*a* can be suppressed.

In addition, in the present embodiment as well, the moving mechanism 80 may relatively move the coupling member 50 with respect to the recording head 2 in the Z-axis direction by reciprocating the head unit 3 supporting the recording head 2 in the Z-axis direction by the driving source 83 alone.

In addition, the recording apparatus 1 of the present embodiment includes the recording head 2 (liquid ejecting head) that has the ejecting surface 2*a* including the nozzle 10 that ejects a liquid in the +Z direction (ejecting direction) along the Z-axis (first axis) toward the medium S, the plurality of individual supporting members 110 (medium supporting members) that is arranged with a gap in between when viewed in the +Z direction and has the supporting surface 110*a* supporting the medium S, the cap 40 that is disposed in the gap when viewed in the +Z direction, the coupling member 50 that has the base member 51 and the first coupling member 52 coupling the base member 51 to corresponding one of the individual supporting members 110 and configured to extend/contract in a direction along the Z-axis direction and couples the individual supporting member 110 to the cap 40, and the moving mechanism 80 that causes relative movement of the coupling member 50 with respect to the recording head 2 along the Z-axis.

In addition, the capping operation in which the cap 40 that is located on an opposite side from the ejecting surface 2*a* with respect to the supporting surface 110*a* comes into contact with the ejecting surface 2*a* through the gap is performed when the individual supporting member 110 comes into contact with the head supporting member 7 (facing member) facing the individual supporting member 110 by the relative movement of the base member 51 approaching the recording head 2, and the first coupling member 52 is contracted.

In such a configuration as well, the same effects as those in the above embodiments can be obtained. For example, while the restriction of the positional relationship between the individual supporting member 110, which is the "medium supporting member", and the recording head 2, which is the "liquid ejecting head", is reduced, the capping operation can be appropriately performed. In addition, the apparatus configuration can be simplified and reduced in size.

Note that in the present embodiment, although an example in which the "facing member" is the supporting member 7 is described, the "facing member" may be the recording head 2 or the main frame 4. That is, the "facing member" may be any one of the recording head 2, the head supporting member 7 supporting the recording head 2, and the main frame 4 of the recording apparatus 1. In addition, when the "facing member" is the recording head 2, a part of the supporting surface 110*a* of the individual supporting member 110 may overlap a part of the recording head 2 when viewed in the Z-axis direction.

In addition, in the present embodiment, as the individual supporting member 110, a configuration including the rotation member 111 that rotates along with the movement of the medium S is exemplified, but the configuration of the individual supporting member 110 is not particularly limited. The individual supporting member 110 may include a plate-like member that forms a supporting surface supporting the medium S, instead of the rotation member 111.

OTHER EMBODIMENTS

Although some embodiments of the present disclosure have been described above, the basic configuration of the present disclosure is not limited to the above configurations.

Figure 24:
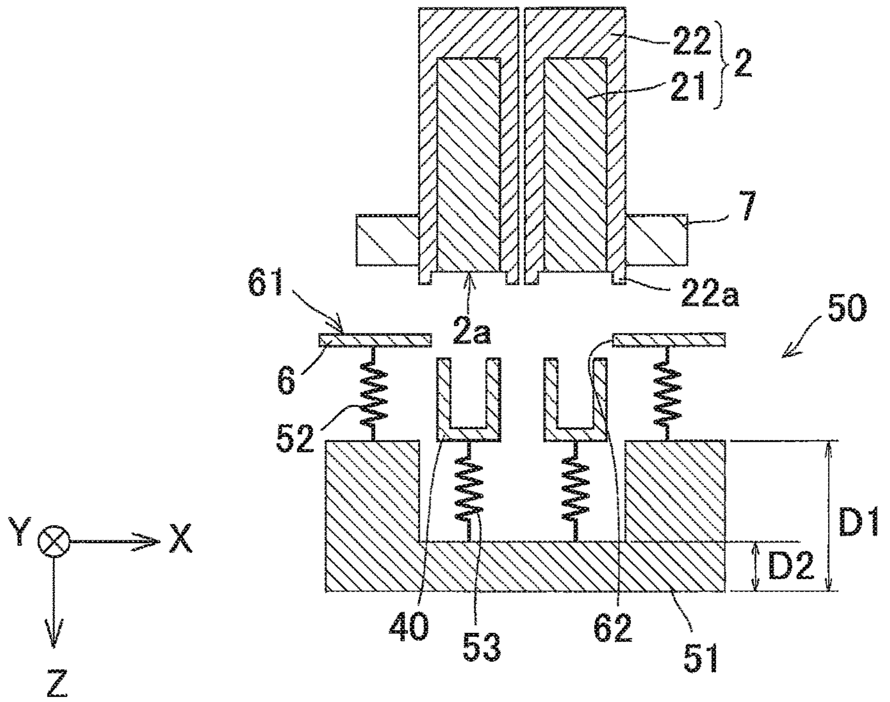
FIG. 24 is a sectional view illustrating a coupling member according to another embodiment of the present disclosure.

For example, the coupling member 50 is not limited to the above configuration. In the above configuration, the first coupling member 52 is longer than the second coupling member 53 when having a natural length, but the first coupling member 52 does not have to be longer than the second coupling member 53. For example, as illustrated in FIG. 24, when a thickness D1 of a portion of the base member 51 on which the first coupling member 52 is provided is made thicker than a thickness D2 of a portion on which the second coupling member 53 is provided, the second coupling member 53 may be configured to be longer than the first coupling member 52 when having a natural length. In addition, as illustrated in FIG. 24, the first coupling member 52 may be disposed at a location deviated with respect to the cap 40 in the X-axis direction.

Figure 25:
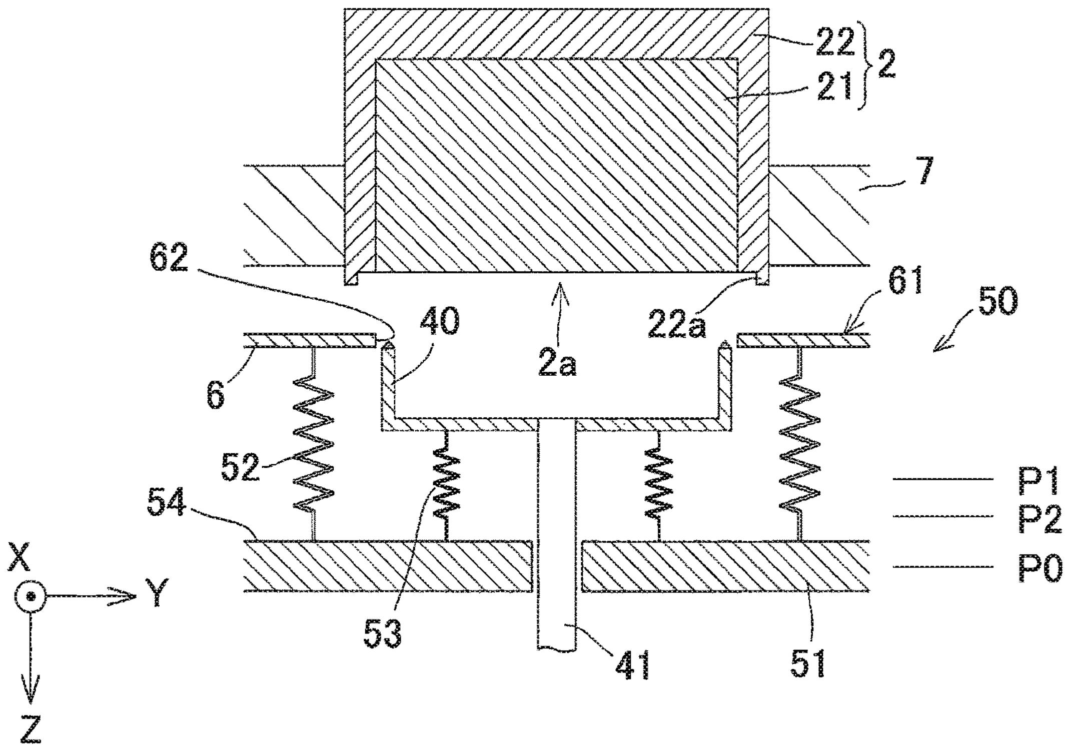
FIG. 25 is a sectional view for explaining another example of a movement of the coupling member according to the present disclosure.

In addition, in the above embodiments, during the recording operation and the idle ejection operation, each cap 40 is disposed further in the +Z direction than is the platen 6, but the configuration is not limited to this aspect. As illustrated in FIG. 25, during the recording operation and the idle ejection operation, the cap 40 may be disposed such that a tip end of the cap 40 in the −Z direction is located inside the opening portion 62 as long as the tip end of the cap 40 in the −Z direction is located further in the +Z direction than is the supporting surface 61. In other words, during the recording operation and the idle ejection operation, the cap 40 and the platen 6 may overlap each other when viewed in a direction perpendicular to the Z-axis. In this manner, with a configuration in which the cap 40 and the ejecting surface 2*a* are close to each other at the initial position P0, generation of mist by idle ejection can be reduced. In addition, since the moving distance from the initial position P0 to the second position P2 can be reduced, the apparatus can be reduced in size.

In addition, in the above embodiments, the suction tube 41 is coupled to the cap 40, but the suction tube 41 does not have to be coupled to the cap 40.

In addition, in the above Embodiments 1 to 4, the medium S is supported by the platen 6 having a plate shape, but the configuration of the platen 6 is not limited thereto. For example, a recessed portion is formed at a predetermined position of a surface of the supporting surface 61 of the platen 6, and the rotation member 111 exemplified in Embodiment 5 may be rotatably supported in the recessed portion.

Moreover, the present disclosure is applicable to any type of liquid ejecting apparatus including a liquid ejecting head and is also applicable to a liquid ejecting apparatus including a recording head such as an ink jet recording head, a color material ejecting head used for manufacturing a color filter of a liquid crystal display or the like, an electrode material ejecting head used for forming an electrode of an organic electroluminescent (EL) display, a field emission display (FED), or the like, and a bioorganic material ejecting head used for manufacturing a biochip.

Supplement

Based on the embodiments exemplified above, for example, the following configuration can be understood.

A liquid ejecting apparatus according to Aspect 1, which is a preferred aspect, includes a liquid ejecting head that has an ejecting surface including a nozzle that ejects a liquid in an ejecting direction along a first axis toward a medium, a medium supporting member that has a supporting surface supporting the medium and an opening portion facing the nozzle, a cap that is disposed in the opening portion when viewed in the ejecting direction, a coupling member that has a base member and a first coupling member coupling the base member to the medium supporting member and configured to extend/contract in a direction along the first axis and couples the medium supporting member to the cap, and a moving mechanism that causes relative movement of the coupling member with respect to the liquid ejecting head along the first axis. As a result, while the restriction of the positional relationship between the medium supporting member and the liquid ejecting head is reduced, the capping operation can be appropriately performed. In addition, the apparatus configuration can be simplified and reduced in size.

In addition, in Aspect 2, which is a specific example of Aspect 1, the cap is disposed on an opposite side from the ejecting surface with respect to the supporting surface during ejection operation in which the liquid ejecting head ejects a liquid toward the medium.

In addition, in Aspect 3, which is a specific example of Aspect 2, capping operation in which the cap comes into contact with the ejecting surface through the opening portion is performed when the medium supporting member comes into contact with a facing member facing the medium supporting member by the relative movement in which the base member approaches the liquid ejecting head and the first coupling member is contracted.

In addition, in Aspect 4, which is a specific example of Aspect 3, the facing member is any one of the liquid ejecting head, a head supporting member supporting the liquid ejecting head, and a main frame of the liquid ejecting apparatus.

In addition, in Aspect 5, which is a specific example of Aspect 4, the facing member is the head supporting member or the main frame, the medium supporting member has a projecting portion projecting in an opposite direction from the ejecting direction from the supporting surface in a non-transport area outside an area where the medium is transported when viewed in the ejecting direction, and when the capping operation is performed, the first coupling member is contracted when the projecting portion comes into contact with the head supporting member or the main frame. As a result, a step is not generated on the ejecting surface and a surface of the head supporting member, and the wiping performance is improved.

In addition, in Aspect 6, which is a specific example of Aspect 4, the facing member is the liquid ejecting head, the liquid ejecting head has an outer peripheral rib projecting in the ejecting direction from the ejecting surface in an outer peripheral portion of the ejecting surface, and when the capping operation is performed and the outer peripheral rib comes into contact with the medium supporting member, the first coupling member is contracted. As a result, deformation of the ejecting surface of the liquid ejecting head due to a contact of the medium supporting member with the ejecting surface and peeling of a water repellant film formed on the ejecting surface can be suppressed.

In addition, in Aspect 7, which is a specific example of Aspect 1, a wiping member is further included, and wiping operation for wiping the ejecting surface is performed when the wiping member is relatively moved along the ejecting surface with respect to the ejecting surface in a space between the medium supporting member and the ejecting surface, the space being formed by the relative movement in which the base member is separated from the liquid ejecting head. As a result, similarly to the capping operation is performed, a space for performing the wiping operation can be ensured only by the relative movement of the liquid ejecting head and the coupling member in a direction along the first axis, and the apparatus configuration can be simplified and reduced in size.

In addition, in Aspect 8, which is a specific example of Aspect 1, a head unit that has the liquid ejecting head and a head supporting member supporting the liquid ejecting head is further included, the moving mechanism includes a driving source that reciprocates only one of the coupling member and the head unit along the first axis, and the relative movement is performed only by the driving source. As a result, the apparatus configuration can be further simplified and reduced in size.

In addition, in Aspect 9, which is a specific example of Aspect 1, the opening portion is smaller than the ejecting surface when viewed in the ejecting direction. As a result, the transportation of the medium can be more stable.

In addition, in Aspect 10, which is a specific example of Aspect 1, the first coupling member is provided on a surface of the base member facing an opposite direction from the ejecting direction.

In addition, in Aspect 11, which is a specific example of Aspect 1, the coupling member includes a second coupling member that couples the base member to the cap and is configured to extend/contract in a direction along the first axis. As a result, when the capping operation is performed, application of an excessive load to the ejecting surface by the cap can be suppressed.

In addition, in Aspect 12, which is a specific example of Aspect 1, the liquid ejecting head configures a line head having a length equal to or more than a width of the medium.

In addition, a liquid ejecting apparatus according to Aspect 13, which is another preferred aspect, includes a liquid ejecting head that has an ejecting surface including a nozzle that ejects a liquid in an ejecting direction along a first axis toward a medium, a plurality of medium supporting members that is arranged with a gap in between when viewed in the ejecting direction and has a supporting surface supporting the medium, a cap that is disposed in the gap when viewed in the ejecting direction, a coupling member that has a base member and a first coupling member coupling the base member to corresponding one of the medium supporting members and configured to extend/contract in a direction along the first axis and couples the medium supporting member to the cap, and a moving mechanism that causes relative movement of the coupling member with respect to the liquid ejecting head along the first axis. As a result, while the restriction of the positional relationship between the medium supporting member and the liquid ejecting head is reduced, the capping operation can be appropriately performed. In addition, the apparatus configuration can be simplified and reduced in size.

In Aspect 14, which is a specific example of Aspect 13, capping operation in which the cap located on an opposite side from the ejecting surface with respect to the supporting surface comes into contact with the ejecting surface through the gap is performed when the medium supporting member comes into contact with a facing member facing the medium supporting member by the relative movement in which the base member approaches the liquid ejecting head, and the first coupling member is contracted.

In Aspect 15, which is a specific example of Aspect 14, the facing member is any one of the liquid ejecting head, a head supporting member supporting the liquid ejecting head, and a main frame of the liquid ejecting apparatus.

In Aspect 16, which is a specific example of Aspect the facing member is the head supporting member, and the supporting surface overlaps at least a part of the head supporting member when viewed in the ejecting direction.

In Aspect 17, which is a specific example of Aspect the facing member is the liquid ejecting head, and a part of the supporting surface overlaps a part of the liquid ejecting head when viewed in the ejecting direction.

In Aspect 18, which is a specific example of Aspect 13, a head unit that has the liquid ejecting head and a head supporting member supporting the liquid ejecting head is further included, the moving mechanism includes a driving source that reciprocates only one of the coupling member and the head unit along the first axis, and the relative movement is performed only by the driving source. As a result, the apparatus configuration can be further simplified and reduced in size.

What is claimed is:

1. A liquid ejecting apparatus comprising:

a liquid ejecting head that has an ejecting surface including a nozzle configured to eject a liquid in an ejecting direction along a first axis toward a medium;

a medium supporting member that has a supporting surface supporting the medium and an opening portion facing the nozzle;

a cap that is disposed in the opening portion when viewed in the ejecting direction;

a coupling member that has a base member and a first coupling member coupling the base member to the medium supporting member and configured to extend/contract in a direction along the first axis and that couples the medium supporting member to the cap; and a moving mechanism that causes relative movement of the coupling member with respect to the liquid ejecting head along the first axis.

2. The liquid ejecting apparatus according to claim 1, wherein the supporting surface is disposed between the ejecting surface and the cap during ejection operation in which the liquid ejecting head ejects a liquid toward the medium.

3. The liquid ejecting apparatus according to claim 2, wherein capping operation in which the cap comes into contact with the ejecting surface through the opening portion is performed when the medium supporting member comes into contact with a facing member facing the medium supporting member by the relative movement in which the base member approaches the liquid ejecting head and the first coupling member is contracted.

4. The liquid ejecting apparatus according to claim 3, wherein the facing member is any one of the liquid ejecting head, a head supporting member supporting the liquid ejecting head, and a main frame of the liquid ejecting apparatus.

5. The liquid ejecting apparatus according to claim 4, wherein the facing member is the head supporting member or the main frame, the medium supporting member has a projecting portion projecting in an opposite direction from the ejecting direction from the supporting surface in a non-transport area outside an area where the medium is transported when viewed in the ejecting direction, and when the capping operation is performed, the first coupling member is contracted when the projecting portion comes into contact with the head supporting member or the main frame.

6. The liquid ejecting apparatus according to claim 4, wherein the facing member is the liquid ejecting head, the liquid ejecting head has an outer peripheral rib projecting in the ejecting direction from the ejecting surface in an outer peripheral portion of the ejecting surface, and when the capping operation is performed and the outer peripheral rib comes into contact with the medium supporting member, the first coupling member is contracted.

7. The liquid ejecting apparatus according to claim 1, further comprising a wiping member, wherein wiping operation for wiping the ejecting surface is performed when the wiping member is relatively moved along the ejecting surface with respect to the ejecting surface in a space between the medium supporting member and the ejecting surface, the space being formed by the relative movement in which the base member is separated from the liquid ejecting head.

8. The liquid ejecting apparatus according to claim 1, further comprising a head unit that has the liquid ejecting head and a head supporting member supporting the liquid ejecting head, wherein the moving mechanism includes a driving source that reciprocates only one of the coupling member and the head unit along the first axis, and the relative movement is performed only by the driving source.

9. The liquid ejecting apparatus according to claim 1, wherein the opening portion is smaller than the ejecting surface when viewed in the ejecting direction.

10. The liquid ejecting apparatus according to claim 1, wherein the first coupling member is provided on a surface of the base member facing an opposite direction from the ejecting direction.

11. The liquid ejecting apparatus according to claim 1, wherein the coupling member includes a second coupling member that couples the base member to the cap and is configured to extend/contract in a direction along the first axis.

12. The liquid ejecting apparatus according to claim 1, wherein the liquid ejecting head configures a line head having a length equal to or more than a width of the medium.

13. A liquid ejecting apparatus comprising:

a liquid ejecting head that has an ejecting surface including a nozzle configured to eject a liquid in an ejecting direction along a first axis toward a medium;

medium supporting members that is arranged with a gap in between when viewed in the ejecting direction and has a supporting surface supporting the medium;

a cap that is disposed in the gap when viewed in the ejecting direction;

a coupling member that has a base member and a first coupling member coupling the base member to corresponding one of the medium supporting members and configured to extend/contract in a direction along the first axis and that couples the medium supporting member to the cap; and a moving mechanism that causes relative movement of the coupling member with respect to the liquid ejecting head along the first axis.

14. The liquid ejecting apparatus according to claim 13, wherein capping operation in which the cap located on an opposite side from the ejecting surface with respect to the supporting surface comes into contact with the ejecting surface through the gap is performed when the medium supporting member comes into contact with a facing member facing the medium supporting member by the relative movement in which the base member approaches the liquid ejecting head and the first coupling member is contracted.

15. The liquid ejecting apparatus according to claim 14, wherein the facing member is any one of the liquid ejecting head, a head supporting member supporting the liquid ejecting head, and a main frame of the liquid ejecting apparatus.

16. The liquid ejecting apparatus according to claim 15, wherein the facing member is the head supporting member, and the supporting surface overlaps at least a part of the head supporting member when viewed in the ejecting direction.

17. The liquid ejecting apparatus according to claim 15, wherein the facing member is the liquid ejecting head, and a part of the supporting surface overlaps a part of the liquid ejecting head when viewed in the ejecting direction.

18. The liquid ejecting apparatus according to claim 13, further comprising a head unit that has the liquid ejecting head and a head supporting member supporting the liquid ejecting head, wherein the moving mechanism includes a driving source that reciprocates only one of the coupling member and the head unit along the first axis, and the relative movement is performed only by the driving source.

* * * * *